(12) United States Patent
Bhagavatula et al.

(10) Patent No.: US 6,963,682 B2
(45) Date of Patent: Nov. 8, 2005

(54) BEAM ALTERING FIBER LENS DEVICE AND METHOD OF MANUFACTURE

(75) Inventors: Venkata A. Bhagavatula, Big Flats, NY (US); Nagaraja Shashidhar, Painted Post, NY (US); John Himmelreich, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 283 days.

(21) Appl. No.: 10/202,562

(22) Filed: Jul. 23, 2002

(65) Prior Publication Data

US 2003/0165292 A1 Sep. 4, 2003

Related U.S. Application Data

(60) Provisional application No. 60/361,787, filed on Mar. 4, 2002.

(51) Int. Cl.$^7$ ................................................ G02B 6/32
(52) U.S. Cl. ......................................... 385/33; 385/124
(58) Field of Search .............................. 385/33–35, 124

(56) References Cited

U.S. PATENT DOCUMENTS

| | | | | |
|---|---|---|---|---|
| 3,894,789 A | * | 7/1975 | Kobayashi et al. ........... | 385/34 |
| 4,130,343 A | | 12/1978 | Miller et al. | |
| 4,490,020 A | * | 12/1984 | Sakaguchi et al. ........... | 385/33 |
| 4,756,590 A | | 7/1988 | Forrest et al. | |
| 4,865,417 A | | 9/1989 | Yamamoto et al. | |
| 4,932,989 A | * | 6/1990 | Presby ........................ | 65/387 |
| 5,011,254 A | * | 4/1991 | Edwards et al. .............. | 385/33 |
| 5,163,113 A | | 11/1992 | Melman ...................... | 385/31 |
| 5,293,438 A | | 3/1994 | Konno et al. ................. | 385/35 |
| 5,351,323 A | | 9/1994 | Miller et al. .................. | 385/28 |
| 5,402,510 A | * | 3/1995 | Kalonji et al. ................ | 385/33 |
| 5,446,816 A | | 8/1995 | Shiraishi et al. .............. | 385/33 |
| 5,455,879 A | | 10/1995 | Modavis et al. .............. | 385/33 |
| 5,606,181 A | | 2/1997 | Sakuma et al. ............... | 257/88 |

(Continued)

FOREIGN PATENT DOCUMENTS

| | | | |
|---|---|---|---|
| DE | 31 34 508 A1 | 3/1983 | ......... C03B/37/075 |
| EP | 0 155 379 A2 | 9/1985 | ............ G02B/6/42 |
| EP | 0 558 230 A1 | 9/1993 | ........... G02B/6/255 |
| EP | 0 802 433 A1 | 10/1997 | ............ G02B/6/10 |
| EP | 0 872 747 | 10/1998 | ............ G02B/6/42 |
| JP | 2000 304965 | 11/2000 | ............ G02B/6/32 |
| WO | WO01/71403 | 9/2001 | |

OTHER PUBLICATIONS

U.S. Provisional Application 60/352,735, filed Jan. 29, 2002.*
U.S. Provisional Appl. No. 60/298,841, filed Jun. 15, 2001.*
Shute et al., A Study of the Polarization Properties of a Rectangular Polarization–Maintaining Fiber, Journal of Lightware Technology, Dec. 7, 1989, No. 12.
Bludau et al., Low–Loss Laser–to–Fiber Coupling with Negligible Optical Feedback, Journal of Lightware Technology, vol. LT–3, No. 2, Apr. 1985.
Yoda et al., Journal of Lightwave Technology, vol. 19, No. 12, Dec. 2001, pp. 1910–1917.

Primary Examiner—Rodney Bovernick
Assistant Examiner—Mike Stahl
(74) Attorney, Agent, or Firm—Timothy M. Schaeberle

(57) ABSTRACT

A multi-lens apparatus for altering the mode field of an optical signal is disclosed. The apparatus includes an optical fiber having a core region defining an optical axis and a GRIN-fiber lens positioned in relation to one end of the optical fiber. A biconic lens including an external surface defined by two different curves disposed substantially orthogonal to one another, a major curve $C_1$ and a minor curve $C_2$, with $C_1$ and $C_2$ intersecting at or near the optical axis is positioned in relation to an end of the GRIN-fiber lens remote from the fiber. A method of manufacturing a multi-lens apparatus for altering the mode field of an optical signal, and an optical assembly are also disclosed.

55 Claims, 14 Drawing Sheets

U.S. PATENT DOCUMENTS

| | | | |
|---|---|---|---|
| 5,638,471 A | 6/1997 | Semo et al. | 385/33 |
| 5,719,973 A | 2/1998 | Monroe et al. | 385/34 |
| 5,774,607 A * | 6/1998 | Shiraishi et al. | 385/33 |
| 5,796,525 A * | 8/1998 | Dempewolf et al. | 359/653 |
| 5,953,162 A | 9/1999 | Blankenbecler | 359/653 |
| 6,075,650 A | 6/2000 | Morris et al. | 359/641 |
| 6,081,637 A | 6/2000 | Rekow | 385/31 |
| 6,081,638 A | 6/2000 | Zhou | 385/31 |
| 6,130,972 A | 10/2000 | Shiraishi et al. | 385/33 |
| 6,205,274 B1 | 3/2001 | Zhou | 385/38 |
| 6,253,004 B1 * | 6/2001 | Lee et al. | 385/31 |
| 6,594,419 B2 * | 7/2003 | Ukrainczyk et al. | 385/33 |
| 2002/0159693 A1 * | 10/2002 | Wolak et al. | 385/33 |
| 2003/0048987 A1 * | 3/2003 | Saito et al. | 385/33 |

* cited by examiner

BEAM ALTERING FIBER LENS DEVICE AND METHOD OF MANUFACTURE

CROSS REFERENCE TO RELATED APPLICATIONS

This application claims the benefit of U.S. Provisional Application Ser. No. 60/361,787, filed Mar. 4, 2002, and entitled, "Beam Altering Fiber Lens Device and Method of Manufacture," which is hereby incorporated herein by reference.

BACKGROUND OF INVENTION

1. Field of the Invention

The present invention relates generally to optical devices for mode-transforming interconnections, and more particularly, to a multi-lens mode-transforming apparatus configured to facilitate high efficiency coupling of optical signals passed between optical components and/or other waveguides having different mode fields.

While the present invention is subject to a wide range of applications, it is particularly well suited for coupling sources of elliptically-shaped optical signals, such as laser diodes and semiconductor waveguides, to optical fibers having circularly symmetric mode fields.

2. Technical Background

Coupling optical signals passed between signal sources, such as laser diodes, optical fibers, and Semiconductor Optical Amplifiers (SOAs), and other optical components, such as optical fibers, specialty fibers, SOAs and the like, with a high coupling efficiency, is an important aspect of optical communications. A conventional light-emitting module incorporated in an optical communications system generally includes a semiconductor laser, such as a laser diode, serving as a light source, an optical fiber having a light carrying core, and a lens such as a spherical lens, self-focusing lens or aspherical lens interposed between the semiconductor laser and optical fiber for converging the laser beam onto the optical fiber core. Since the light-emitting module typically requires high coupling efficiency between the semiconductor laser and the optical fiber, the module is preferably assembled with the optical axes of the semiconductor laser, lens, and optical fiber aligned with each other in order to achieve maximum coupling power. The relatively large size and high cost of early light-emitting modules, due in part to lens spacing and alignment issues, have driven advancement in the field and have resulted in a number of alternative approaches.

One such approach is the use of a graded-index (GRIN)-rod lens. Unlike other lenses, the index of refraction of a GRIN-rod lens is radially-dependent and is at a maximum at the optical axis of the rod lens. Generally speaking, the refractive index profile across a GRIN-rod lens is parabolic in shape, and thus it is the lens medium itself, rather than the air-lens interface, that performs the lensing. Accordingly, unlike conventional lenses, GRIN-rod lenses have planar input and output surfaces making refraction at these surfaces unnecessary. This characteristic enables optical elements at either end of the lens to be fixed in place with index-matching glue or epoxy. The index gradient is typically produced by an ion-exchange process that is both time-consuming and expensive. A typical GRIN-rod lens, for example, may be produced by ion-exchange of thallium or cesium-doped silica glass. A molten salt bath may be used for the ion-exchange process such that sodium and either thallium or cesium ions diffuse out of the glass, while potassium ions diffuse into the glass from a 500° C. $KNO_3$ bath.

Since it is the refractive index profile of the lens medium resulting from this process that lenses the light, tight controls are required during the manufacturing process to ensure that a given GRIN-rod lens has the appropriate refractive index profile for a particular coupling application. Moreover, unlike GRIN-fiber lenses employed in accordance with the present invention, GRIN-rod lenses are poorly adapted for splicing to standard telecommunication fibers, and/or other optical components. Generally speaking, GRIN-rod lenses are multi-component glass structures that have significantly different coefficients of thermal expansion and softening points (the temperature at which the glass softens) than the optical waveguides to which they are coupled. GRIN-fiber lenses, on the other hand are typically made by a fiber manufacturing process and are high silica composition structures. Thus, the softening points and thermal expansion coefficients of GRIN-fiber lenses are substantially similar to the softening points and thermal expansion coefficients of most telecommunication fibers and other waveguides to which they may be attached. Accordingly, GRIN-fiber lenses are well adapted to be coupled, as for instance, by fusion splicing, to most telecommunications fibers.

Another approach has been to form a microlens on an end of an optical fiber to provide optical coupling between a semiconductor laser and an optical waveguide. In such an approach, the lens is directly and integrally formed on an end face of the optical fiber at a portion of the fiber on which light from the light source is incident. Such an optical fiber is hereafter referred to as a, "lensed optical fiber". When manufacturing light-emitting modules using such lensed optical fibers, the number of required component parts can be reduced since there is no need for light-converging lenses apart from the fiber itself, and since the number of operations associated with axial alignment may also be reduced. Lensed optical fibers are referred to as anamorphic lensed optical fiber when the lens formed on the end of the optical fiber is capable of changing the mode field of an optical signal passed therethrough. More specifically, an anamorphic lens formed on the end of the optical fiber is generally capable of changing the elliptical mode field of an optical signal emitted from a laser diode to a substantially circularly symmetric optical signal, which can be more efficiently coupled to the core of an optical fiber having a circularly symmetric mode field.

Each of the above-described approaches have various utilities and advantages that are well known in the art. Each approach does, however, have its own set of limitations. For example, while conventional GRIN-rod lens technology provides excellent symmetrical focusing characteristics for optical signals passed therethrough, GRIN-rod lenses alone generally do not significantly alter the geometric shape of an optical signal as is often required for efficient optical signal coupling applications. In addition, since it is the material characteristics of the GRIN-rod lens itself that provides the focusing, precise manufacturing techniques are necessary in order to provide controlled variation of the refractive index profile of the GRIN-rod lens needed for a particular application.

Likewise, while anamorphic fiber lenses readily facilitate the changing of the geometric shape of the optical signal or beam passing through them, the range of available working distances for anamorphic lens applications is somewhat limited. Accordingly, if suitable working distances are not available for particular applications, coupling losses may be significant, thereby making many coupling applications impractical.

What is needed therefore, but presently unavailable in the art, is a multi-lens apparatus for optical signal coupling applications that overcomes these and other shortcomings associated with the use of anamorphic lenses or GRIN-rod lenses alone. Such a multi-lens apparatus should be capable of changing the geometric shape and other mode field characteristics of an optical signal passing through the apparatus, while at the same time providing design flexibility that will limit coupling losses, allow a broader range of acceptable working distances, minimize phasefront aberrations, and generally provide greater control and efficiency in optical signal coupling applications. Such a multi-lens apparatus should be relatively inexpensive to manufacture, be relatively easy to mass produce, and in general, have a far broader range of applications without significantly altering the material properties and characteristics of the lenses themselves. It is to the provision of such a multi-lens device that the present invention is primarily directed.

SUMMARY OF THE INVENTION

One aspect of the present invention relates to a multi-lens apparatus for altering the mode field of an optical signal. The apparatus includes an optical fiber having a core region defining an optical axis and a GRIN-fiber lens positioned in relation to one end of the optical fiber. A biconic lens, having an external surface defined by two different curves disposed substantially orthogonal to one another, a major curve $C_1$ and a minor curve $C_2$, with $C_1$ and $C_2$ intersecting at or near the optical axis, is positioned in relation to an end of the GRIN-fiber lens remote from the fiber.

In another aspect, the present invention is directed a method of manufacturing a multi-lens apparatus for altering the mode field of an optical signal. The method includes the steps of positioning one end of a GRIN-fiber lens in relation to one end of an optical fiber having a core region defining an optical axis, and forming a biconic lens in relation to an end of the GRIN-fiber lens remote from the optical fiber. The biconic lens external surface is preferably defined by two different curves disposed substantially orthogonal to one another, a major curve $C_1$ and a minor curve $C_2$, where $C_1$ and $C_2$ intersect at or near the optical axis.

In yet another aspect, the present invention is directed to an optical assembly. The assembly includes an optical component, a substrate configured to support the component, and a multi-lens apparatus positioned on the substrate and in relation to the optical component to change the mode field of an optical signal passed between the multi-lens apparatus and the optical component. The multi-lens apparatus includes an optical fiber having a core region defining an optical axis, a GRIN-fiber lens positioned in relation to one end of the optical fiber, and a biconic lens formed in relation to an end of the GRIN-fiber lens remote from the fiber. The biconic lens includes a external surface defined by two different curves disposed substantially orthogonal to one another, a major curve $C_1$ and a minor curve $C_2$, where $C_1$ and $C_2$ intersect at or near the optical axis.

The multi-lens apparatus of the present invention results in a number of advantages over other mode-transforming devices known in the art. In one respect, since a biconic lens may be formed directly on an end of a GRIN-fiber lens, the geometric shape of the mode field of an optical signal may be altered by the biconic lens, while the focusing of the altered optical signal may be largely performed by the GRIN-fiber lens. As a result, the wavefront of the optical signal may be better matched to that of the optical component to which the optical signal is coupled. Accordingly, coupling losses are minimized and phasefront aberrations are reduced. The multi-lens apparatus of the present invention may also be designed to provide for a greater range of operative working distances. As a result of these and other advantages, coupling efficiencies are greatly improved.

Additional advantages are provided by the method of manufacturing a multi-lens apparatus in accordance with the present invention. More specifically, the multi-lens apparatus of the present invention may preferably be fabricated such that certain features of the biconic lens, the GRIN-fiber lens, or both may be altered without impacting the design characteristics of the unaltered features of the multi-lens apparatus. In this way, a GRIN-fiber lens fabricated for a specific application may be used for other applications as well. For example, the multi-lens apparatus may be fashioned such that the mode field of an optical signal passing therethrough may be changed from an elliptical mode field to a circular mode field, from a circular mode field to an elliptical mode field, from a mode field having one ellipticity to a mode field having a different ellipticity, or from one mode field to another mode field having the same shape but a different size, as desired. In addition, the multi-lens apparatus of the present invention may be designed such that it can alter the mode field of an optical signal passing through the multi-lens apparatus in either direction.

In addition to these advantages, the GRIN-fiber lens itself provides a number of advantages in the manufacture of the present invention. As mentioned hereinabove, GRIN-fiber lenses are preferably high silica containing structures preferably made by conventional multi-mode fiber manufacturing processes. Because GRIN-fiber lenses are made by telecommunication fiber manufacturing techniques, GRIN-fiber lenses manufactured in accordance with the present invention may be drawn to the desired dimensions with a high degree of accuracy. Generally speaking, GRIN-fiber lenses may be drawn having an outside diameter ranging from about 25.0 microns to about 1000.0 microns. More preferably, such GRIN-fiber lenses may be drawn such that they have outside diameters ranging from about 50.0 microns to about 500.0 microns. Still more preferably, such GRIN-fiber lenses may have an outside diameter of between about 75.0 microns to about 250.0 microns. In addition, since GRIN-fiber lenses are drawn using traditional fiber drawing equipment, large diameter rods or blanks may be manufactured and thereafter drawn to long lengths (up to several kilometers) of fiber while maintaining the core to clad ratio of the original large diameter rod, thus making manufacturing and splicing easier. Accordingly, the desired refractive index profile, among other characteristics, of the GRIN-fiber lens may be designed into the larger rod or blank which provides for precision submicron control over the resulting GRIN-fiber lens optical properties.

In addition to these advantages, GRIN-fiber lenses may be fabricated in accordance with the present invention such that they have the predetermined material characteristics for more than one mode-transforming application. Since the biconic lens may be formed on the GRIN-fiber lens or on a coreless spacer rod or fiber affixed to the GRIN-fiber lens, rather than the GRIN-fiber lens itself, GRIN-fiber lenses and coreless spacer rods having the same length, formed of the same materials, having the same aspect ratios, and having the same cross-sectional areas may be affixed to pigtail fibers having different characteristics and/or mode fields. Thereafter, each GRIN-fiber lens and/or coreless rod may be altered, by cleaving to the appropriate length, for example, to provide the required mode field transforming functionality required for the particular fiber pigtail to which each GRIN-fiber lens and/or spacer rod is affixed. As will be described in greater detail, this may preferably be accomplished by cleaving or otherwise cutting each GRIN-fiber lens and/or spacer rod to the desired length and shaping the cut end of each rod to have the desired mode transforming effect.

Although GRIN-fiber lenses in accordance with the present invention may be designed at or close to quarter pitch length, it should be noted that the GRIN-fiber lens is not limited to a quarter pitch length. Generally speaking, the GRIN-fiber lens may be designed to quarter pitch length for special applications such as large aspect ratio biconic lens applications. In applications known in the art, GRIN-fiber lenses are manufactured to have an outside diameter that matches the outside diameter of the optical waveguide to which they are attached. Accordingly, when the outside diameter of the optical waveguide is 125.0 microns, the GRIN-fiber lens is also typically manufactured to have an outside diameter of 125.0 microns. Thus, when two optical waveguides, each having outside diameters of 125.0 microns have different mode fields, the difference in the refractive index profile ($\Delta$) is changed for each GRIN-fiber lens so that the GRIN-fiber lens can meet the specifications while maintaining the same 125.0 micron outside diameter. In accordance with the present invention, the outside diameter of the GRIN-fiber lens need not be maintained at 125.0 microns. Instead the difference in the refractive index $\Delta$ of the GRIN-fiber lenses are kept substantially the same and the outside diameter, core diameter, and length of each GRIN-fiber lens is preferably changed to meet the mode-transforming requirements for each optical waveguide. In accordance with the present invention, the diameter of the GRIN-fiber lens may be smaller, larger, or equal to the outside diameter of the optical waveguide to which it is attached. In addition, and in accordance with the present invention, the length of each GRIN-fiber lens may be different than the quarter pitch when necessary. As a result, and in accordance with the present invention, the same blank may be used to draw GRIN-fiber lenses for use in various applications. Since the refractive index profile of the blank need not be changed, the blank making process and GRIN-fiber lens making process may be simplified. As a result, the same blank can be used for different mode-transforming applications. The blank is merely preferably redrawn to different outside diameters for different applications and the resulting GRIN-fiber lens may be cut or cleaved to different lengths. Again, manufacturing and cost saving efficiencies are maximized.

Manufacturing of the spacer rod in accordance with the present invention provides additional advantages. Generally speaking, the spacer rod has a substantially uniform refractive index profile that is made from silica, some other high silica glass containing material, or may be a 96% silica glass manufactured by Corning, Incorporated, and known as Vycor®. Generally speaking, and in accordance with the present invention, the spacer rod may be cylindrical in shape, may be rectangular in shape, or may be manufactured to take on some other geometric shape. Like the GRIN-fiber lens discussed above, the spacer rods are preferably manufactured from an approximately one (1) meter long rod or blank that is drawn, using conventional fiber manufacturing techniques and equipment, to the desired diameter, such as, but not limited to, 125.0 microns. Generally speaking, the spacer rod is drawn in kilometer lengths and thereafter cut or cleaved to the appropriate length for the particular mode-transforming application.

In applications where a biconic lens is to be formed on an end of a spacer rod, it is advantageous to utilize a spacer rod that is preshaped for the particular mode-transforming application. For example, and in accordance with the present invention, when a particular application requires that a substantially circularly symmetric mode field be transformed to a substantially elliptical mode field, it may be preferable to form a biconic lens in accordance with the present invention on the end of a spacer rod that is substantially rectangular in shape rather than on the end of a cylindrical rod. In such instances it may be preferable to first form a blank approximately one (1) meter in length that is itself rectangular in shape. The rectangular blank may then be drawn using conventional fiber drawing techniques and equipment to form a substantially rectangular spacer rod having a desired outside diameter, such as 125.0 microns. In this way, several kilometers of substantially rectangular shaped spacer rod material may be drawn from a single blank and thereafter cut to the desired lengths to create spacer rods having the desired optical properties. While the edges of the resultant rectangular spacer rod material may likely become somewhat rounded during the drawing process, a substantially rectangular shape will be maintained provided the temperature of the draw furnace, the drawing speed, and the tension under which the rod material is drawn are controlled. Moreover, the aspect ratios and other optical properties of the final cleaved rectangular spacer rods formed by the drawing process will be substantially maintained. Such processing facilitates mass manufacturing and controlled dimensions of the final spacer rod. By forming the spacer rod in this manner, the end of the spacer rod is much more closely sized to the dimensions and surface curvatures of the biconic lens that will be formed on the end of the spacer rod. As a result the amount of grinding and polishing typically required to form the biconic lens is reduced compared to the amount of grinding and polishing typically necessary to form a wedge shaped biconic lens on the end of a cylindrical spacer rod.

All of the above-mentioned aspects of the present invention provides for large scale production of GRIN-fiber lenses and/or spacer rods, which in turn facilitates ease of manufacture, reduced costs associated with the manufacturing process, and greater economies of scale.

Additional features and advantages of the invention will be set forth in the detailed description which follows and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed. The accompanying drawings are included to provide further understanding of the invention, illustrate various embodiments of the invention, and together with the description serve to explain the principles and operation of the invention.

DETAILED DESCRIPTION OF THE PREFERRED EMBODIMENTS

Figure 1A:
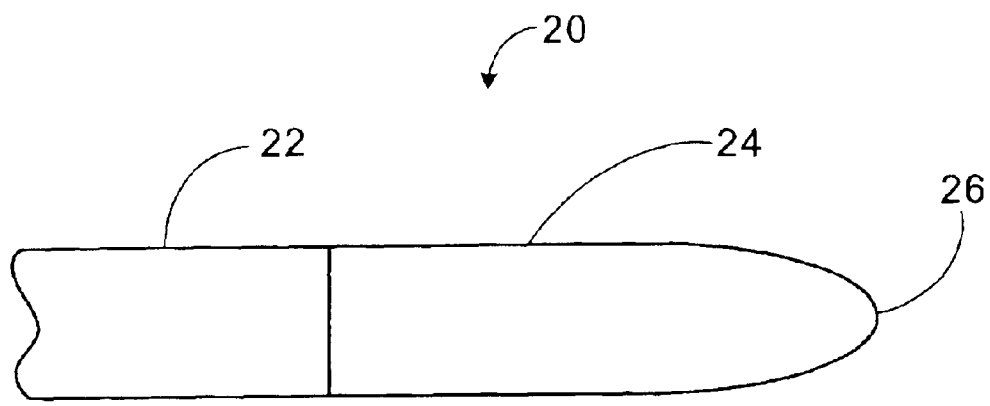
FIG. 1A schematically illustrates a top view of an exemplary multi-lens apparatus in accordance with the present invention.

Reference will now be made in detail to the present preferred embodiments of the invention, examples of which are illustrated in the accompanying drawing figures. Wherever possible, the same reference numerals will be used throughout the drawings to refer to the same or like parts. An exemplary embodiment of the multi-lens apparatus of the present invention is shown in FIGS. 1A and 1B and is designated generally throughout by reference numeral 20.

Figure 1B:
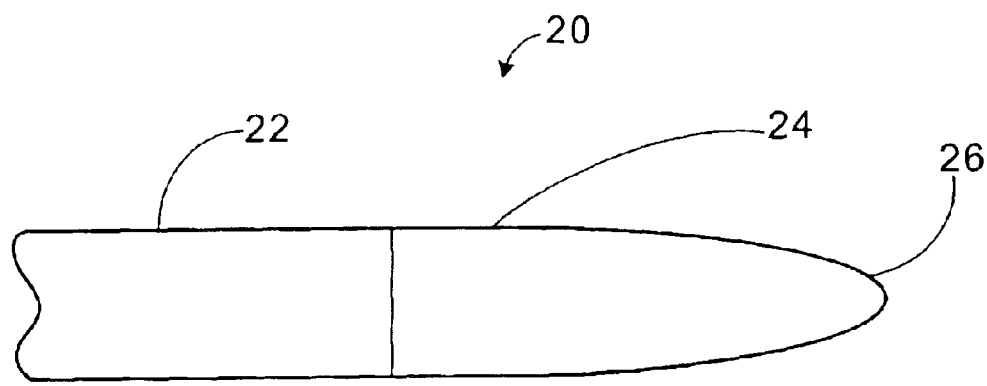
FIG. 1B schematically illustrates a side elevational view of the multi-lens apparatus depicted in FIG. 1A.

Generally speaking, exemplary multi-lens apparatus 20 depicted in the top view of FIG. 1A and in the side view of FIG. 1B includes an optical fiber or pigtail fiber 22, a GRIN-fiber lens 24 having a square law index or parabolic refractive index profile positioned at one end of pigtail fiber 22, and a biconic lens 26 disposed on an end of GRIN-fiber lens 24 remote from pigtail fiber 22. Pigtail fiber 22 may be a standard single mode fiber, such as an SMF-28 fiber manufactured by Corning Incorporated, a polarization maintaining (PM) fiber, a multi-mode fiber or other specialty fiber, such as a high index fiber, used in optical communication systems. Moreover, pigtail fiber 22 may be circularly symmetrical when viewed from the end or may be any other shape. Biconic lens 26 may be formed directly on GRIN-fiber lens 24 (see for example, FIG. 2A). As will be described in greater detail below with reference to FIG. 2C, biconic lens 26 may also be disposed on one end of a separate coreless spacer rod, which may itself be affixed to an end of GRIN-fiber lens 24 remote from pigtail fiber 22.

Figure 1C:
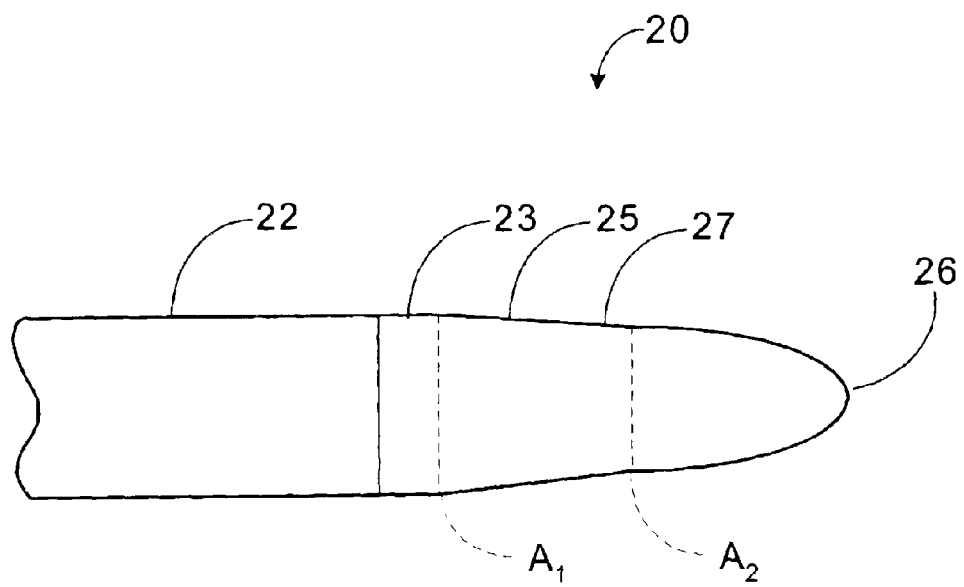
FIG. 1C schematically illustrates a top view of an exemplary tapered multi-lens apparatus in accordance with one aspect of the present invention.
Figure 1D:
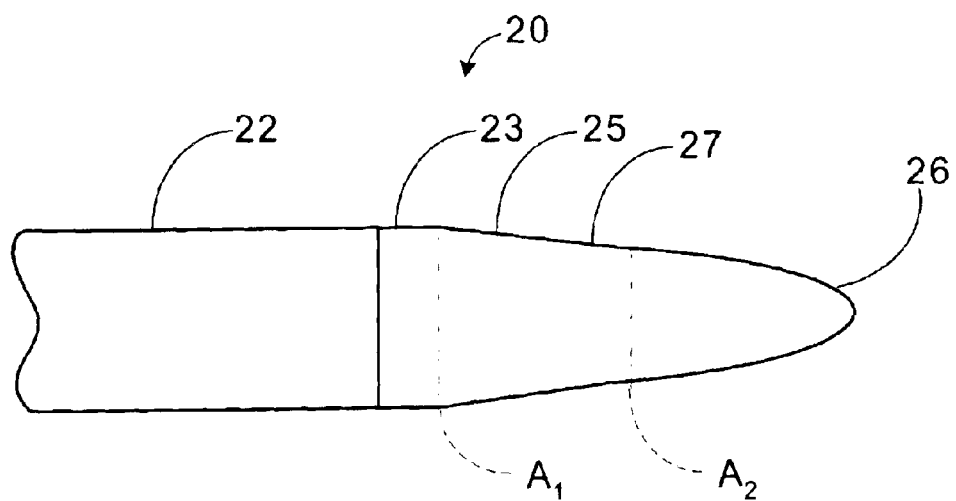
FIG. 1D schematically illustrates a side elevational view of the tapered multi-lens apparatus depicted in FIG. 1C.

In accordance with another aspect of the present invention, multi-lens apparatus 20 may be formed such that multi-lens apparatus 20 includes one or more tapered elements as shown in FIGS. 1C and 1D. Such a tapered multi-lens apparatus 20 may include a pigtail fiber 22, a tapered GRIN-fiber lens 25 having a square law index or a parabolic refractive index profile positioned at one end of pigtail fiber 22, and a biconic lens 26 disposed on an end of GRIN-fiber lens 24 remote from pigtail fiber 22. For certain applications, such as laser diode coupling, the output from the laser diode may be as small as 1.0 to 2.0 microns, and the aspect ratio may be in the range from about 2.0 to about 5.0. In order to facilitate mode field matching in such applications, it is preferable that the radii of curvature of biconic lens 26 be small. However, it is also preferable that the diameter of multi-lens apparatus 20 be maintained at a reasonable size so that the various elements of multi-lens apparatus 20 may be manipulated during manufacture. Multi-lens apparatus 20 incorporating tapered GRIN-fiber lens 25 is one preferred approach to meeting these objectives. As shown in the figures, tapered GRIN-fiber lens 25 preferably includes a GRIN-fiber section 23 having a substantially uniform or constant radial outside dimension(s) extending longitudinally from an end of pigtail fiber 22 to phantom line $A_1$, and a tapered GRIN-fiber section 27 having a changing, preferably decreasing, radial outside-dimension(s) (or sloping external surface) extending longitudinally between phantom line $A_1$ and $A_2$. Although not shown in the drawing figures, one of skill in the art will recognize that one or more of pigtail fiber 22, coreless spacer rod(s), and/or GRIN-fiber lens(es) 24, 25, may be tapered in a manner similar to tapered grin-fiber lens 25 depicted in FIGS. 1C and 1D for any of the embodiments described and/or depicted herein.

Alternative exemplary embodiments of multi-lens apparatus 20 of the present invention are depicted in FIGS. 2A–2E and 3A–3B. Unless otherwise stated herein, in each of the depicted embodiments, pigtail fiber 22 will be described as being standard single mode optical fiber, such as an SMF-28 fiber, having an outside diameter of approximately 125.0 microns and a core diameter of approximately 8.0–10.0 microns. Those skilled in the art will recognize that other pigtail fibers having other diameters and other geometric shapes are also within the scope of the present invention. In addition, it will be understood, unless otherwise stated herein, that for any embodiment, biconic lens 26 will be disposed on multi-lens apparatus 20 at a location that is the most remote from pigtail fiber 22.

Figure 2A:
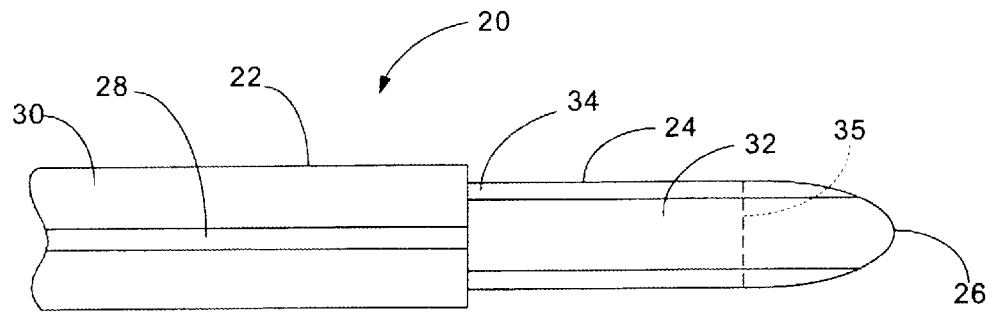
FIG. 2A is a cross-sectional view of a first alternative exemplary embodiment of the multi-lens apparatus of the present invention.

Referring now to FIG. 2A, multi-lens apparatus 20 may preferably include a pigtail fiber 22 having a core region 28 bounded by a cladding region 30, and a GRIN-fiber lens 24 having a core region 32 that may or may not be bounded by a cladding region 34. In a preferred embodiment, the relative refractive index profile of GRIN-fiber lens 24 increases radially toward the optical axis of multi-lens apparatus 20. One end of GRIN-fiber lens 24 is preferably spliced or otherwise affixed to one end of pigtail fiber 22 via an arc fusion splicer or some other device commonly known in the art. A biconic lens 26 is preferably disposed on the end of GRIN-fiber lens 24 remote from pigtail fiber 22. In this and other exemplary embodiments disclosed herein, biconic lens 26 may preferably be formed by conventional shaping techniques, by a combination of shaping and heating, by laser micro-machining, or by other methods that will be described in greater detail below. Moreover, broken line 35 is depicted in this and other embodiments to denote the circumferential position along multi-lens apparatus 20 at which biconic surface 26 ends in accordance with the present invention.

Biconic lens 26 is preferably convex in shape and is preferably sized and shaped such that the mode field of an optical signal passed therethrough is changed to a mode field having the same shape but a different size, from a substantially circularly symmetric shape to an elliptical shape, from an elliptical shape to a substantially circularly symmetric shape, and/or from one elliptical shape to a different elliptical shape. In the embodiment depicted in FIG. 2A, biconic lens 26 is fashioned directly on an end of GRIN-fiber lens 24. Accordingly, biconic lens 26 includes a portion of cladding region 32 and core region 34. In the embodiment depicted in FIG. 2A GRIN-fiber lens 24, as well as biconic lens 26, exhibits an outside diameter less than the outside diameter of pigtail fiber 22.

Figure 2B:
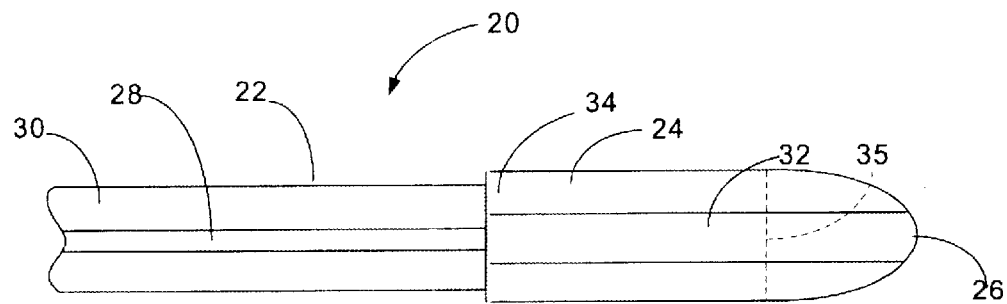
FIG. 2B is a cross-sectional view of a second alternative exemplary embodiment of the multi-lens apparatus of the present invention.

In the alternative exemplary embodiment depicted in FIG. 2B, multi-lens apparatus 20 may include all of the elements discussed above with respect to FIG. 2A. However, GRIN-fiber lens 24 and at least a portion of biconic lens 26 both have a larger outside diameter than pigtail fiber 22. Generally speaking, characteristics such as, but not limited to, the mode field, structure, and size of the device being coupled to multi-lens apparatus 20 will be at least some of the determining factors in the size and other design features of GRIN-fiber lens 24 spliced to pigtail fiber 22. In addition, increasing the size of the outside diameter of GRIN-fiber lens 24 and other elements of multi-lens apparatus 20 of the present invention may facilitate ease of manufacture and otherwise assist in the metrology during fabrication.

Figure 2C:
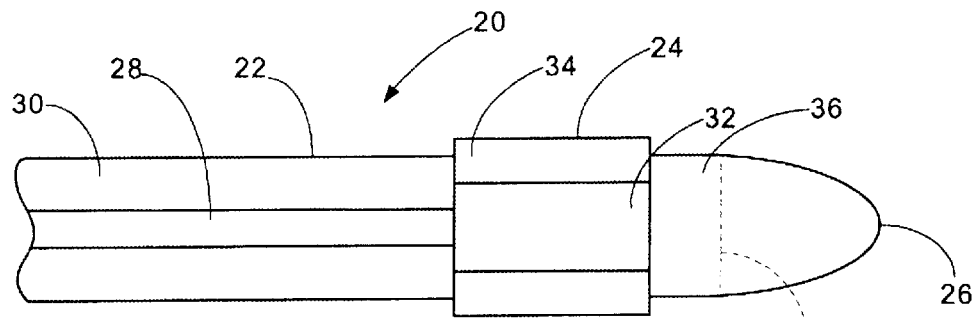
FIG. 2C is a cross-sectional view of a third alternative exemplary embodiment of the multi-lens apparatus of the present invention.
Figure 2D:
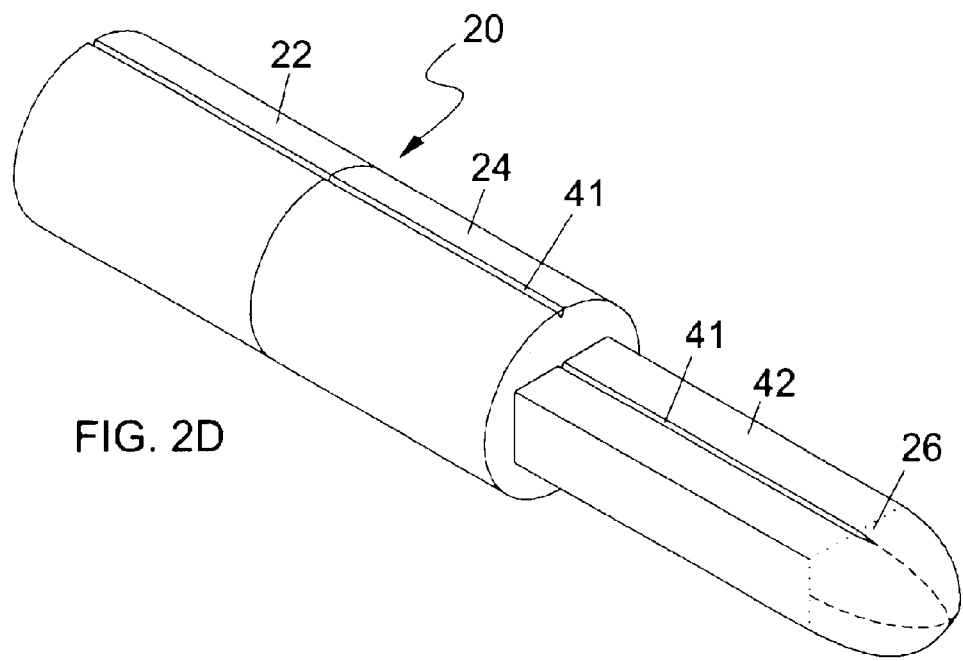
FIG. 2D is a perspective view of a fourth alternative exemplary embodiment of the multi-lens apparatus of the present invention.
Figure 2E:
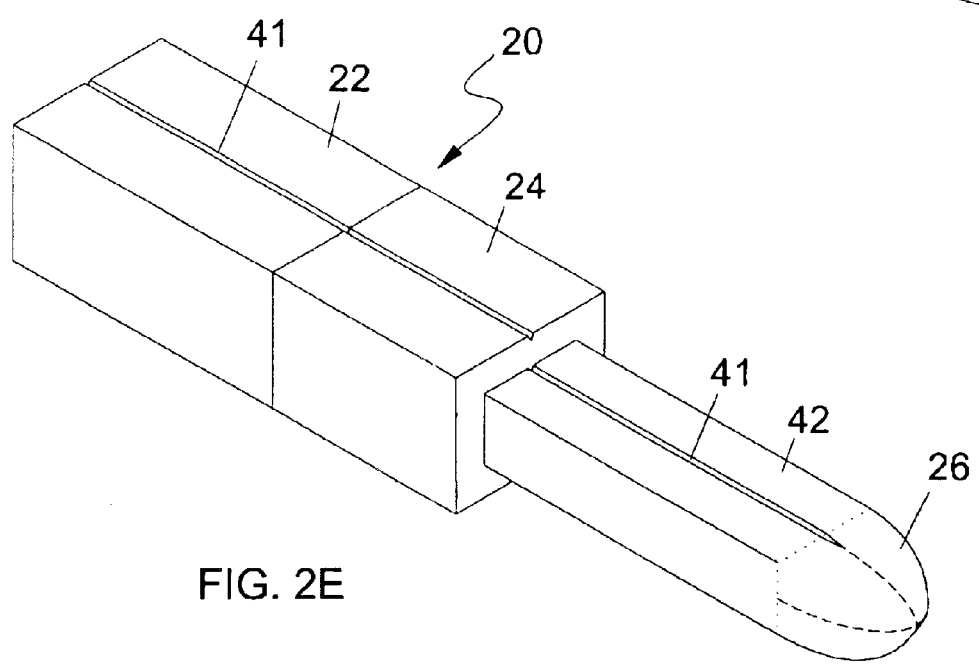
FIG. 2E is a perspective view of a fifth alternative exemplary embodiment of the multi-lens apparatus of the present invention.

Another alternative exemplary embodiment of multi-lens apparatus 20 of the present invention is depicted in FIG. 2C. Unlike the embodiments discussed above, biconic lens 26 is disposed on an end of a spacer rod or fiber 36 of light carrying material having a uniform or constant radial refractive index profile. In a preferred embodiment, rod 36 may be spliced to GRIN-fiber lens 24, and biconic lens 26 may be formed or otherwise disposed on the end of spacer rod 36 remote form GRIN-fiber lens 24, either prior to or after splicing. A spacer rod 42 that is substantially rectangular in shape may alternatively be employed as depicted in FIGS. 2D and 2E. As depicted in FIG. 2D, for example, multi-lens apparatus 20 includes a circularly symmetric pigtail fiber 22, a circularly symmetric GRIN-fiber lens 24, and a substantially rectangular spacer rod 42, an end of which has been shaped to form biconic lens 26. The embodiment depicted in FIG. 2E, depicts each of the pigtail fiber 22, GRIN-fiber lens 24, and spacer rod 42 as substantially rectangular in shape.

One of skill in the art will recognize that spacer rods 36, 42 may be cylindrical in shape, or may be some other geometric shape. In addition, rod 36, 42 may be marked with alignment grooves 41 as shown in the drawing figures or otherwise marked to indicate how rod 36 should preferably be aligned with GRIN-fiber lens 24 in order to maintain the polarization axis of pigtail fiber 22. Such marking is also preferred for GRIN-fiber lens 24, both when biconic lens 26 is formed on spacer rod 36, and when biconic lens 26 is formed directly on GRIN-fiber lens 24 rather than being formed on a separate spacer rod 36 disposed on GRIN-fiber lens 24. One of skill in the art will recognize that such marking is particularly useful when the geometry of the various elements of the multi-lens apparatus 20 is circular or otherwise non-planar.

Figure 2F:
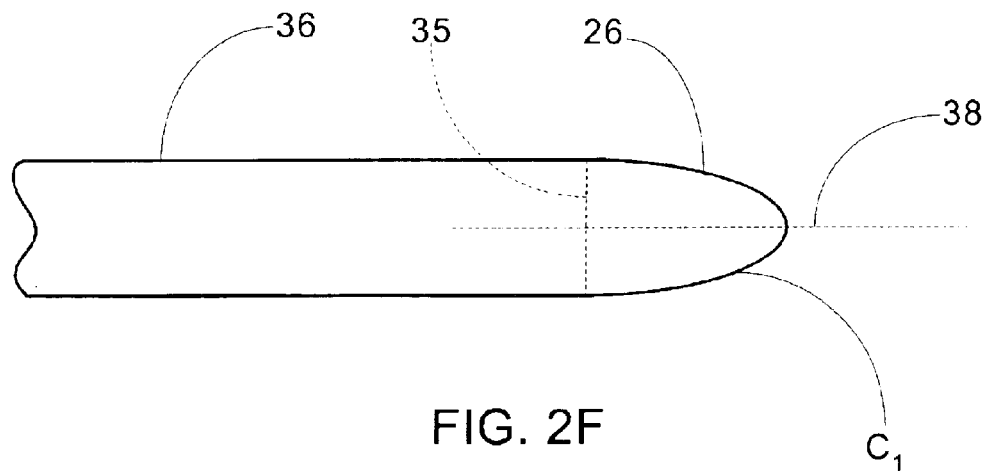
FIG. 2F schematically illustrates a partial top view of the spacer rod depicted in FIG. 2C illustrating aspects of a biconic lens.
Figure 2G:
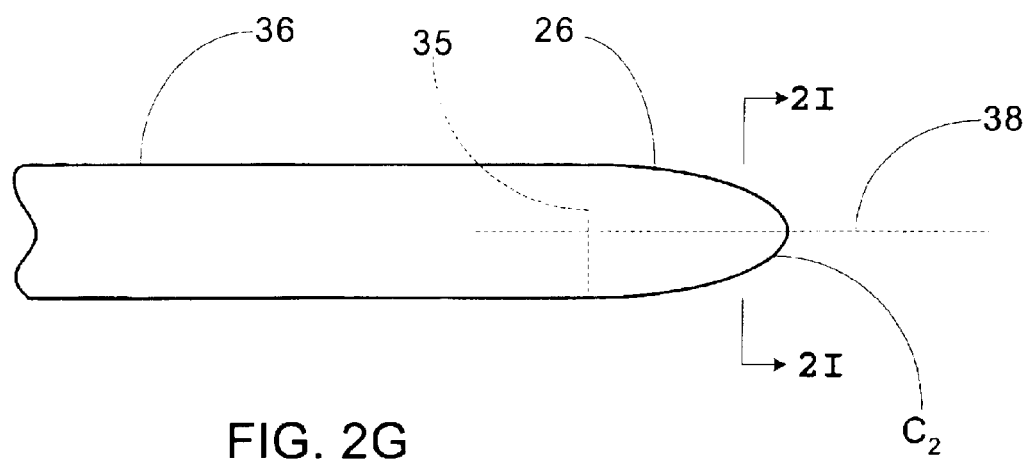
FIG. 2G schematically illustrates a partial side view of the spacer rod depicted in FIG. 2F illustrating additional aspects of the biconic lens.

A top view and a side view of a portion of spacer rod 36 depicted in FIG. 2C is schematically shown in FIG. 2F and FIG. 2G, respectively. Although biconic lens 26 depicted in FIG. 2C is being used for this discussion, the principles expressed hereafter with respect to FIG. 2F and FIG. 2G are equally applicable to the other exemplary embodiments of the in-line beam altering embodiments of the present invention, regardless of whether biconic lens 26 is disposed on the end of GRIN-fiber lens 24, or on the end of a spacer rod 36 that is spliced or otherwise affixed or disposed on GRIN-fiber lens 24.

Figure 2H:
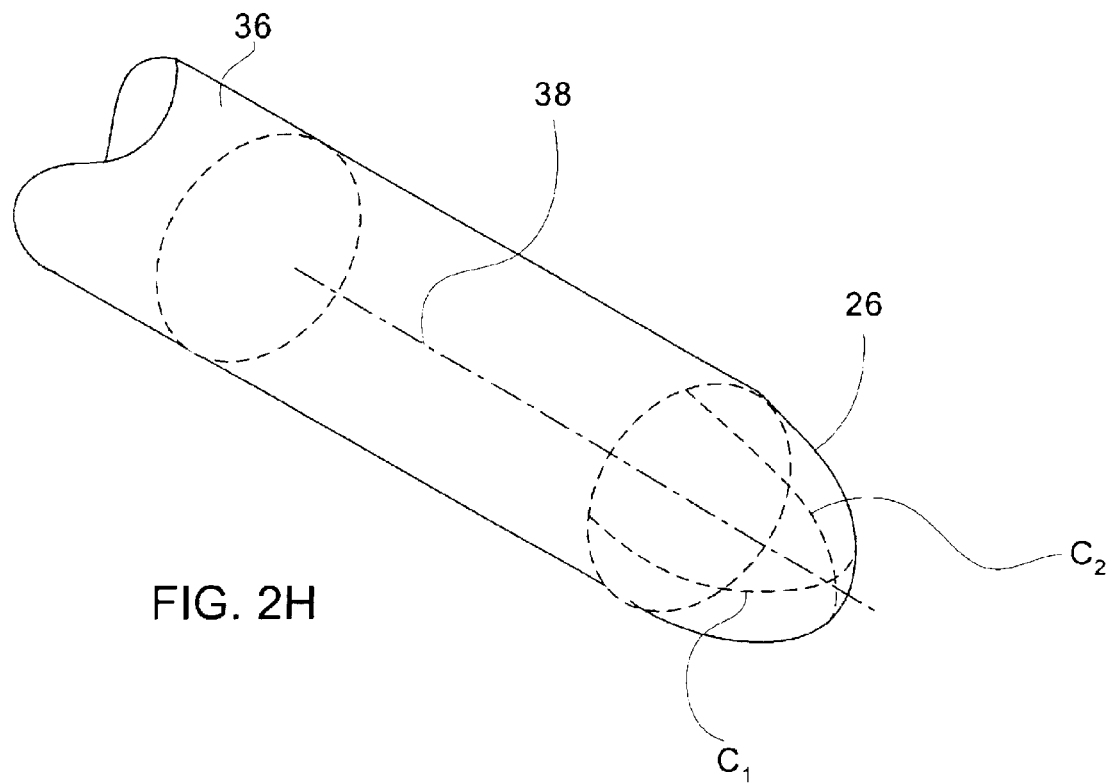
FIG. 2H is a perspective view of the biconic lens depicted in FIG. 2G.
Figure 2I:
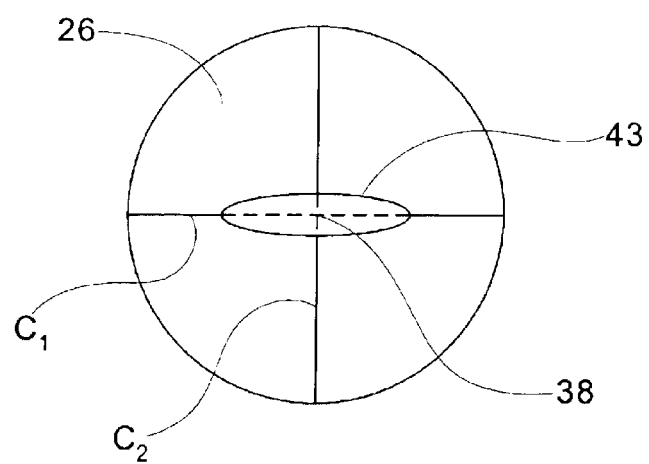
FIG. 2I is a cross-sectional view of the biconic lens taken along lines 2I—2I of FIG. 2G.

FIG. 2F depicts a top view of a portion of rod 36, while the view of rod 36 in FIG. 2G is taken from the side. Regardless of the manufacturing techniques used to arrive at biconic lens 26, biconic lens 26 preferably includes an external surface preferably defined by at least two different curves. A first or major curve $C_1$ is preferably formed in the plane depicted in FIG. 2F, while a second or minor curve $C_2$ is preferably formed in the plane depicted in FIG. 2G. Preferably, curves $C_1$ and $C_2$ are substantially orthogonal to one another and intersect at or near the optical axis 38 as depicted in FIG. 2H and FIG. 2I. The shape of surface 43 of biconic lens 26 may be readily identified with reference to the cross-sectional view depicted in FIG. 2I. In the embodiment shown in FIG. 2I, the curved surface defined by the curves $C_1$ and $C_2$ define a conic surface, for example, an ellipsoid, paraboloid or a hyperboloid. Among other optical properties of biconic lens 26, the difference in the curvatures of curves $C_1$ and $C_2$, and their substantially orthogonal arrangement with respect to one another, provide the in-line beam altering functionality of multi-lens apparatus 20 of the present invention. The different curves $C_1$ and $C_2$ may each define a sphere, may each define an asphere, or one may define a sphere while one may define an asphere. In addition, the curves may define shapes other than ellipsoids, paraboloids or hyperboloids. The result is essentially a surface that provides an anamorphic lens effect. By controlling the shape and curvature of curves $C_1$ and $C_2$ of biconic lens 26, the shape of the mode field of the optical signal passed through biconic lens 26 may be controlled.

Figure 3A:
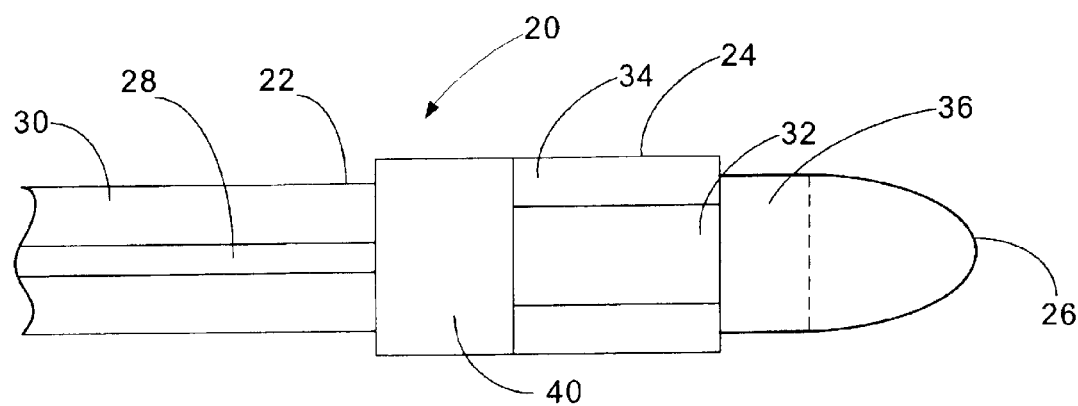
FIG. 3A is a cross-sectional view of a sixth alternative exemplary embodiment of the multi-lens apparatus of the present invention.
Figure 3B:
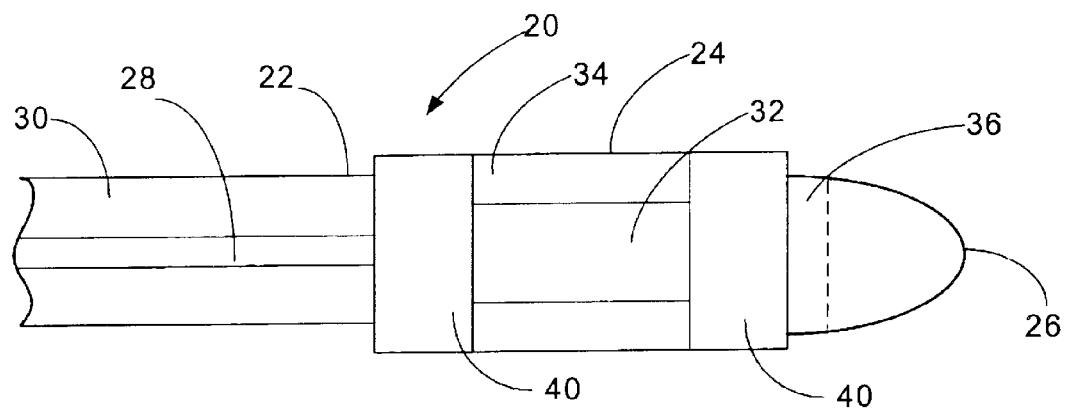
FIG. 3B is a cross-sectional view of a seventh alternative exemplary embodiment of the multi-lens apparatus of the present invention.

An additional exemplary embodiment is shown in cross-section in FIG. 3A. Unlike the embodiments described above, multi-lens apparatus 20 depicted in FIG. 3A includes an additional spacer rod or fiber 40 of light carrying material having a constant or uniform radial refractive index profile. Spacer rod 40 may be positioned between pigtail fiber 22 and GRIN-fiber lens 24 as depicted in FIG. 3A, or it may be positioned between GRIN-fiber lens 24 and biconic lens 26. Alternatively more than one spacer rod 40 may be positioned before and/or after GRIN-fiber lens 24 (as depicted in FIG. 3B), depending upon the requirements of the optical components between which an optical signal is to be passed.

Furthermore, one of ordinary skill in the art will recognize that any portion or region of waveguide material residing between Grin-fiber lens 24 and biconic lens 26 disposed on an end of the waveguide material remote from the GRIN-fiber lens 24, such as the span of spacer rod 36 not shaped to provide an anamorphic lens effect, may itself be defined as a spacer rod. Likewise, while not shown in the drawing figures, multi-lens apparatus 20 may include multiple spacer rods and/or multiple GRIN-fiber lenses, or a single spacer rod and multiple GRIN-fiber lenses, or a single GRIN-fiber lens and multiple spacer rods, depending upon the requirements of a given application and the design approach taken to meet those requirements.

Each of the above-mentioned exemplary embodiments of multi-lens apparatus 20 may share certain common manufacturing techniques. First, an appropriate GRIN-fiber having an operative parabolic index of refraction, a core 32 diameter, and an outside diameter and geometric shape is affixed, preferably by splicing, to a selected pigtail fiber, or to one or more spacer rod(s) 40 which is/are spliced to the end of pigtail fiber 22. Such spacer rods 40 are preferably coreless silica glass containing rods, which may be manufactured to have any suitable outside diameter and geometric shape, and which have a uniform or constant index of refraction, and thus little or no lensing characteristics. When employed, spacer rods 40 provide additional design flexibility. The GRIN-fiber index, the core 32 of the GRIN-fiber, and the lensing parameters such as the quarter pitch length may be determined using well known formulas which are disclosed by Emkey and Jack, *Analysis and Evaluation of Graded-Index Fiber-Lenses*, Journal of Lightwave Technology, Vol. LT-5, No. 9, September 1987, pgs. 1156–64, which is hereby incorporated herein by reference.

The GRIN-fiber may then be cleaved or "taper-cut" to the appropriate length compared to the quarter pitch to form GRIN-fiber lens 24. The process of making a "taper-cut," or "taper-cutting," in accordance with the present invention is described in detail in U.S. patent application Ser. No. 09/812,108, filed Mar. 19, 2001, entitled, "Optical Waveguide Lens And Method Of Fabrication," which is hereby incorporated by reference herein. The cleaved or taper-cut end of the GRIN-fiber lens 24 so formed may then be shaped by an approach, such as, but not limited to, polishing or laser micro-machining, into a wedge shape having suitable wedge angles. The parameters of the GRIN-fiber lens 24, the wedge angles, and rounding radius values may be designed based upon the required working distance and pigtail fiber 22 mode field, and the final mode field shape requirements of the given coupling application. The rounding of the appropriate wedge angles results in a biconic lens 26 disposed on an end of the GRIN-fiber lens 24 remote from pigtail fiber 22, wherein the external surface of the biconic lens 26 is defined by two different curves disposed substantially orthogonal to one another, a major curve $C_1$ and a minor curve $C_2$, where $C_1$ and $C_2$ intersect at or near the optical axis 38 of multi-lens apparatus 20 of the present invention.

The wedge angle of a graded-index biconic lens in accordance with the present invention may be determined using a variety of criteria. Generally speaking, a preferred lens shape for coupling optical sources with small mode field diameters is a hyperbola. Accordingly, conic sections may be used to represent curves $C_1$ and $C_2$ defining the biconic surfaces. In accordance with a preferred embodiment of the present invention, and as described in greater detail with reference to H. N. Presby and C. A. Edwards, *Near 100% Efficient Fibre Microlens*, Electronic Letters, Vol. 28, page 582, 1992, the disclosure of which is hereby incorporated by reference herein, the asymptotes of a hyberbola defining the wedge shape and thus the curves $C_1$ and $C_2$ can be used to determine the wedge angle for the biconic lens. The resulting wedge may be rounded by heating or other methods known in the art to give the preferred hyperbolic curved shape to the GRIN-fiber lens or the spacer rod.

Figure 4:
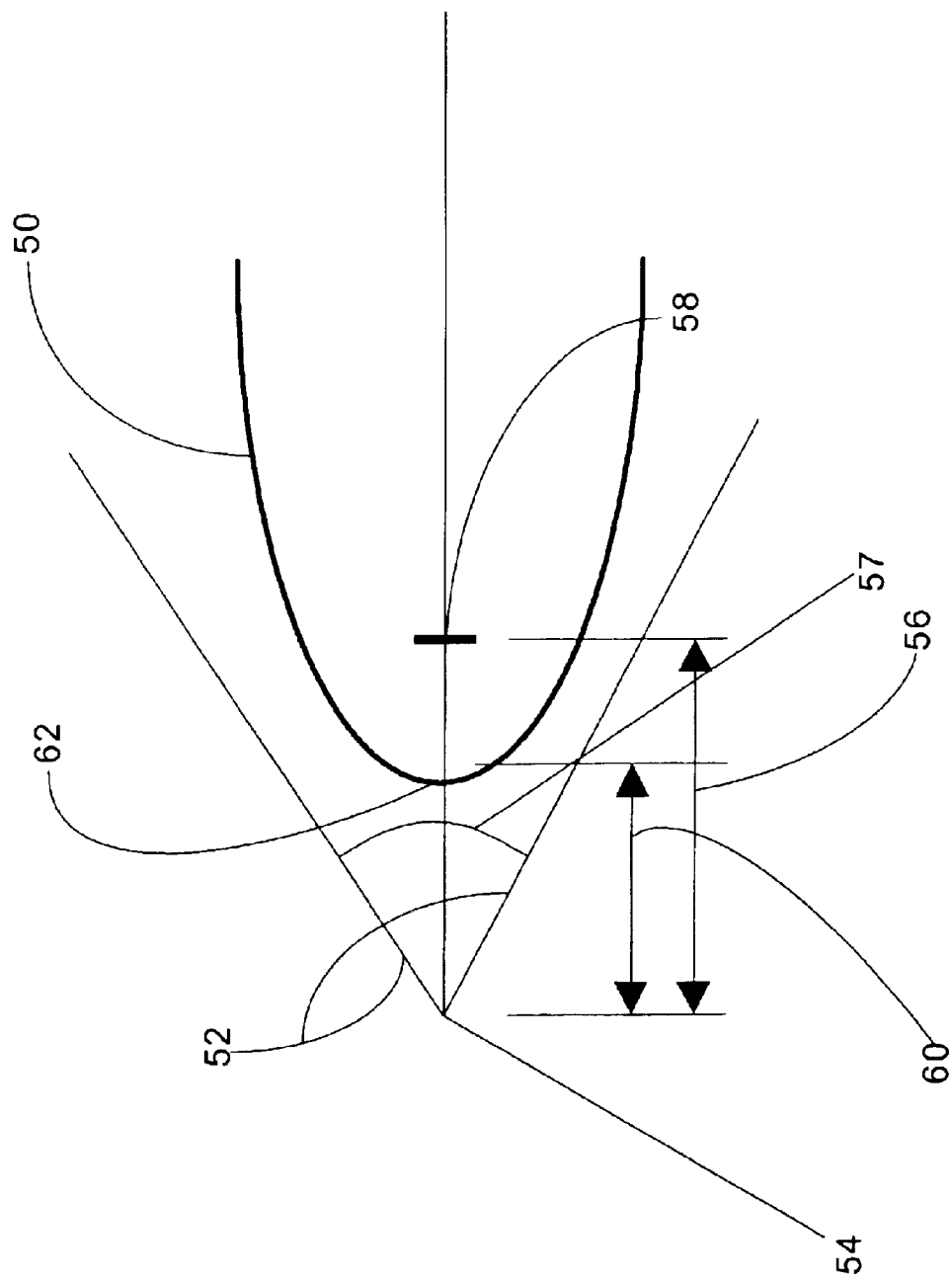
FIG. 4 schematically illustrates a preferred method of forming a wedge angle in accordance with the present invention.

As shown in the schematic illustration depicted in FIG. 4, a hyperbola 50 representing the curve $C_1$ or $C_2$ is preferably defined by asymptotes 52 representing the wedge and intersecting at a central apex 54 at (h, k). The equation defining the hyperbola may be expressed by the following equation:

$$\frac{(x-h)^2}{a^2} - \frac{(y-k)^2}{b^2} = 1$$

Where $$b^2 = c^2 - a^2$$

with c being the distance 56 between the apex 54 and the focal point 58 of the hyperbola (h+c,k) and with a being the distance 60 between the apex 54 and the hyperbola apex 62. The asymptotes are defined by the lines:

$$Y=k+(b^*(x-h)/a) \text{ and } y=k-(b^*(x-h)/a)$$

From the equations of the asymptotes, the wedge angle 57 may be determined as $$\text{Wedge angle}=2^*(\tan^-(b/a))$$

The independently variable curves of the external surface defined on biconic lens 26 provide the anamorphic lens effect and design flexibility to meet the mode coupling requirements for numerous applications. Moreover, the rounded wedge with a controlled radius acts as an anamorphic lens, whereas the GRIN-fiber lens acts as a spherical lens. By defining the parameters of the wedge, and the GRIN-fiber lens, the properties of the anamorphic lens such as the mode field diameter of the focused beam, its aspect ratio (i.e., its ellipticity), and the image distance of the focused beam from the tip of the rounded wedge may be controlled. Such lenses provide anamorphic lens effects for optical coupling along the direction of the optical axis 38 of pigtail fiber 22. It is also possible to arrive at a variety of designs where the core or the outside diameter, size, shape and index difference of the GRIN-fiber lens and pigtail fibers can be varied for different applications. For example, it is possible to have the outside diameter of the GRIN-fiber lens the same, smaller, or larger than the pigtail fiber to accommodate beams of varying size. The shape of the GRIN-fiber lens, the pigtail fiber, and any spacer rods can be non-cylindrical, such as square or rectangular, or may be marked with alignment grooves 41 or otherwise for ease of manufacturing and to facilitate alignment with the polarization axis of the pigtail fiber 22. By aligning the planar sides or markings with the polarization axis of pigtail fiber 22, further processing, such as polishing the wedges and coupling to a laser diode or other optical component with proper polarization axes is simplified.

Spacer rods, as described above may also be positioned between GRIN-fiber lens 24 and biconic lens 26 of the multi-lens apparatus 20 of the present invention when desired or necessary. In such cases, spacer rod(s) 36, 40, 42 may be cleaved and taper-cut as described above, and the end of spacer rod 36, 40, 42 remote from GRIN-fiber lens 24 may be further processed as described above to arrive at a biconic lens 26 fashioned on spacer rod 36, 40, 42 rather than on the GRIN-fiber lens 24.

In the exemplary embodiments depicted in FIGS. 2D and 2E, a non-cylindrical rod such as a rectangular rod 42 is preferably spliced to GRIN-fiber lens 24 which is properly sized and itself spliced to pigtail fiber 22. An advantage of this configuration is realized during manufacturing. Because rectangular rod 42, preferably a coreless silica containing glass material having a uniform radial index of refraction, may be fabricated to closely approximate the desired shape of biconic lens 26 to be formed at the end of multi-lens apparatus 20, manufacturing may be simplified. For example, the formation of a wedge shape on the end of multi-lens apparatus 20, such as by polishing, may not be necessary. At a minimum, the amount and degree of polishing may be significantly reduced. Instead, biconic lens 26 may be preferably formed by merely reheating the end of rod 42 to a temperature sufficient to reflow the glass in order to round the edges of the end of rectangular rod 42. The heat applied to the end of rectangular rod 42 is preferably high enough to soften the glass such that the edges are rounded without further reshaping. Accordingly, a properly shaped biconic lens 26 may be readily fashioned on an end of rod 42 remote from GRIN-fiber lens 24.

Figure 5A:
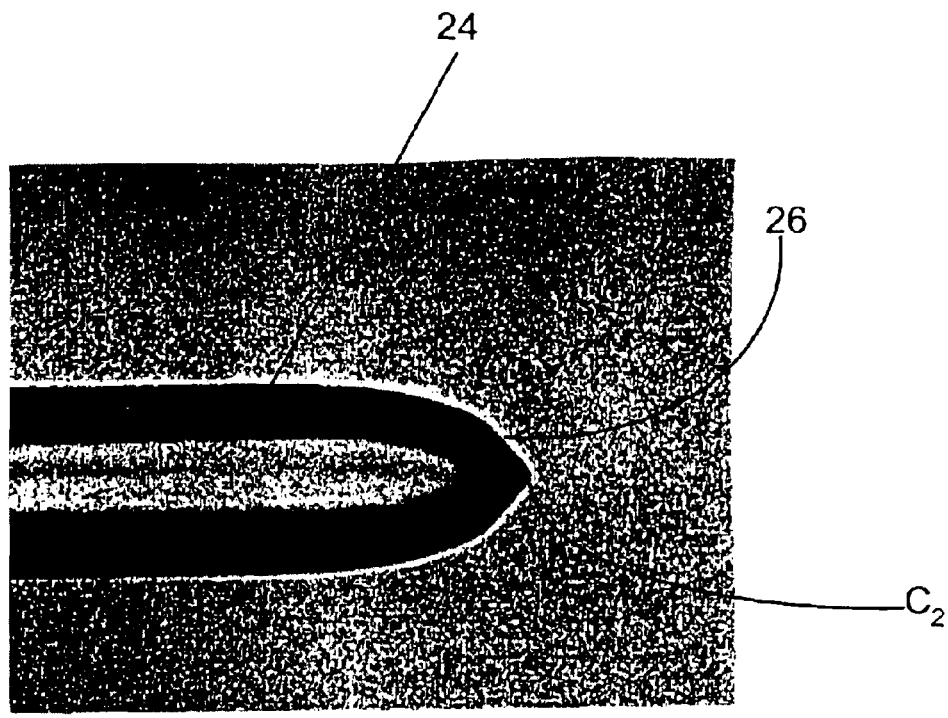
FIG. 5A is a photomicrograph depicting a partial side view of the GRIN-fiber lens depicted in FIGS. 1A and 1B.
Figure 5B:
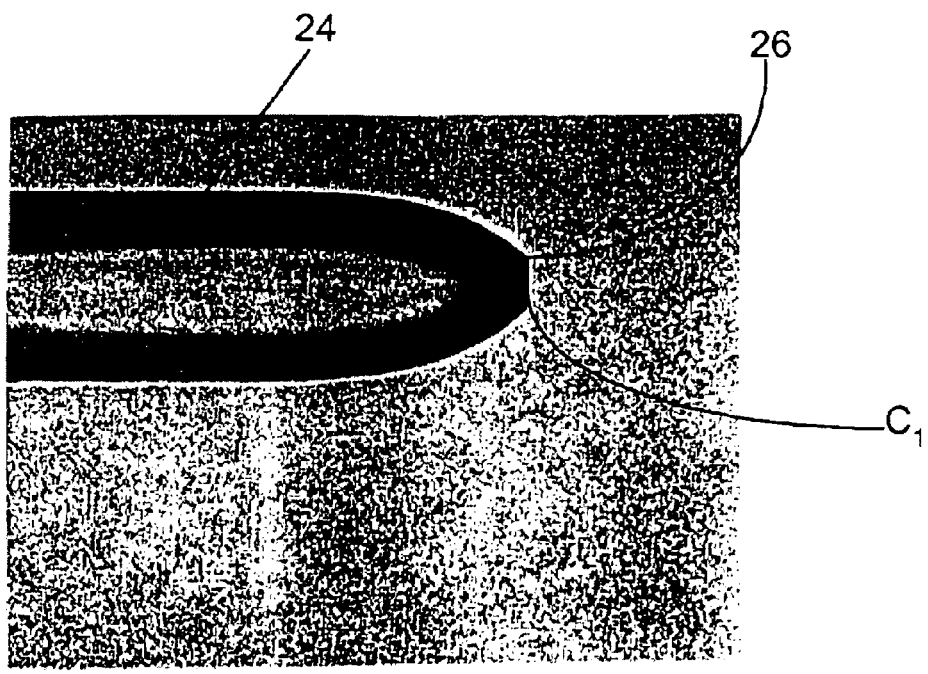
FIG. 5B is a photomicrograph depicting a partial top view of the GRIN-fiber lens depicted in FIG. 4A.

In accordance with one aspect of the operation of the present invention, and as shown in FIGS. 5A–5B, with brief reference to FIGS. 1A and 1B, an optical signal, preferably emitted by a laser diode or other optical device, is preferably passed through biconic lens 26, into and through GRIN-fiber lens 24, and into and through pigtail fiber 22. FIG. 5A is a photomicrograph depicting a partial side view of a multi-lens apparatus 20 similar to that depicted in FIG. 1B, while FIG. 5B is a photomicrograph depicting a partial top view of a multi-lens apparatus 20 similar to that depicted in FIG. 1A. The different curves $C_1$ and $C_2$ defining the external surface of biconic lens 26 can be clearly seen in the figures. In accordance with this aspect of the present invention a substantially elliptical mode field emitted from a laser diode or other waveguide is preferably changed to a circular mode field that substantially matches the mode field of pigtail fiber 22

Figure 5C:
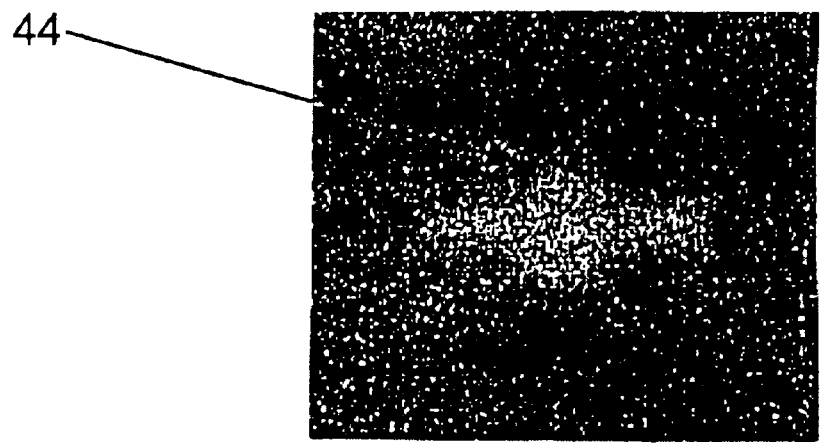
FIG. 5C is a photomicrograph taken from the end of the GRIN-fiber lens depicted in FIG. 4A at the lens surface.
Figure 5D:
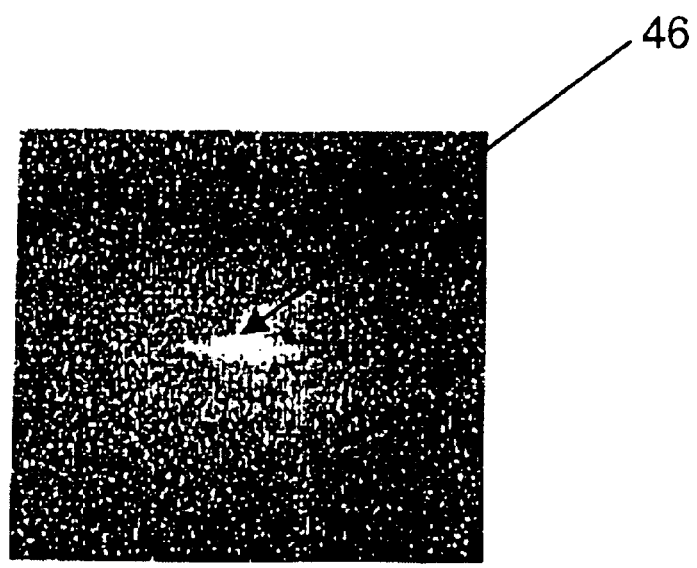
FIG. 5D is a photomicrograph taken from the end of the GRIN-fiber lens depicted in FIG. 4A a distance of approximately 20.0 microns from the lens surface.

In accordance with another aspect of the present invention, the shape of biconic lens 26 may change the mode field shape of the optical signal passed therethrough from a substantially circularly symmetric mode field to a substantially elliptical mode field as shown in the photomicrographs of FIGS. 5C and 5D. In accordance with this aspect of the present invention, an optical signal having a substantially circular mode field may pass through pigtail fiber 22, GRIN-fiber lens 24 and through biconic lens 26. The image 44 depicted in FIG. 5C was taken under magnification from the end of multi-lens apparatus 20 substantially at the surface of biconic lens 26. At this location, image 44 is out of focus and is beginning to change from a circular mode field to an elliptical mode field. As shown in FIG. 5D, however, image 46, which was taken under magnification from the end of multi-lens apparatus 20 at a distance of approximately twenty (20.0) microns from biconic lens 22, is substantially elliptical. Thus, for the embodiment shown, it is at this distance of about twenty (20.0) microns (the image distance) that the elliptical mode field substantially matches the mode field of a component, such as a SOA, to which the optical signal is to be coupled. Accordingly, when packaging such an assembly, the SOA or other optical component having an elliptical mode field may preferably be positioned approximately 20.0 microns away from the end of biconic lens 26 for maximum coupling efficiency and thus minimum optical loss.

Figure 6:
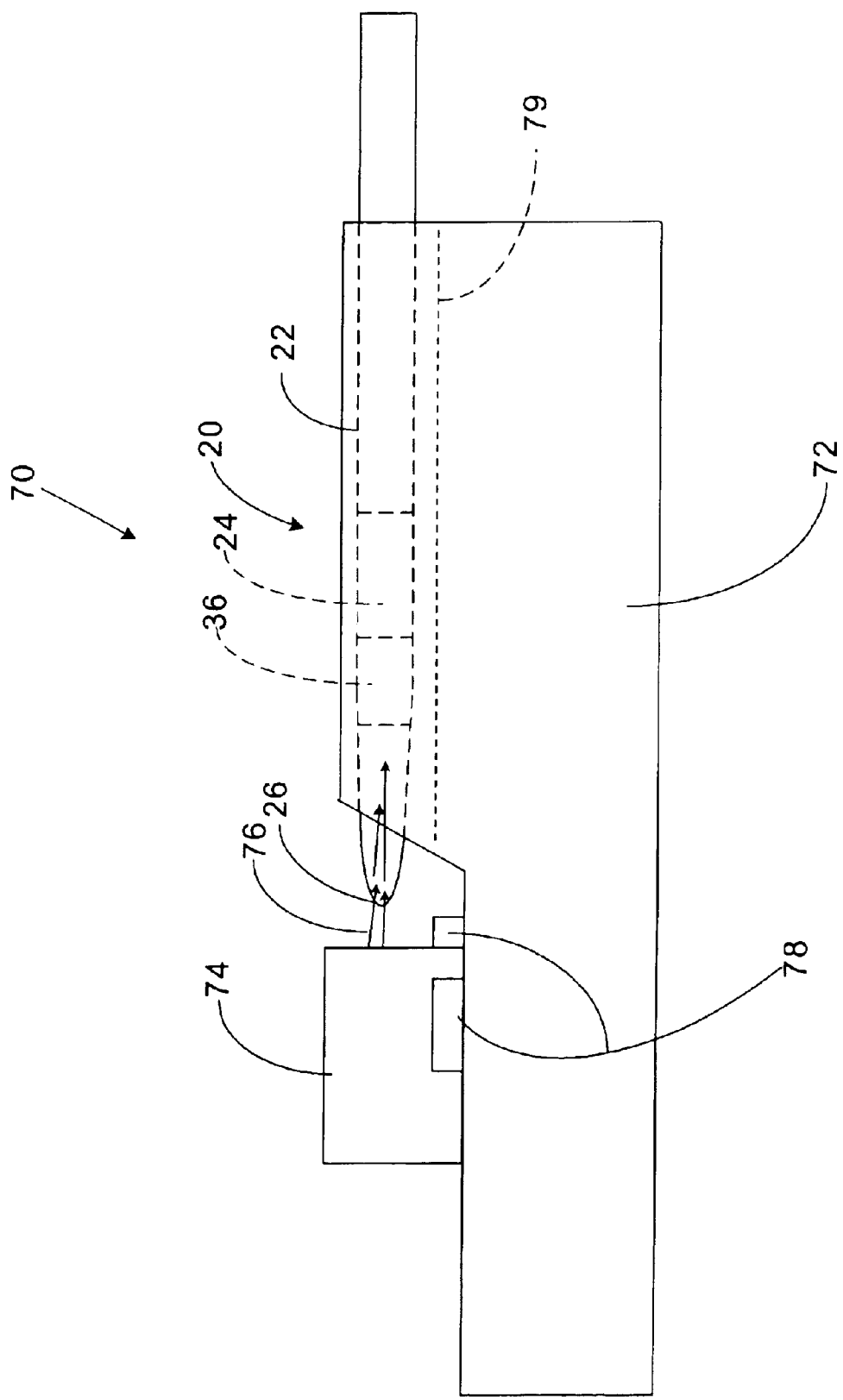
FIG. 6 schematically illustrates a side view of a preferred optical assembly in accordance with the present invention.

An exemplary optical assembly 70 in accordance with the present invention is depicted in FIG. 6. Optical assembly 70 depicted in FIG. 6 is configured for in-line mode-transforming optical coupling applications. Optical assembly 70, preferably includes a substrate 72, and a source 74 of an optical signal 76, such as, but not limited to, a laser diode or other emitter. Source 74 of optical signal 76 is preferably supported on substrate 72 and a multi-lens apparatus 20 in accordance with the present invention is also preferably positioned on substrate 72 such that multi-lens apparatus 20 is capable of communicating with source 74. Optical source 74 is preferably aligned with biconic lens 26 via pedistals or stops 78 affixed to substrate 72. An optical signal 76 having a substantially elliptical mode field is emitted from source 74 in the direction of biconic lens 26. Signal 76 passes through biconic lens 26 which anamorphically alters the mode field of optical signal 76. Optical signal 76 is prefereably changed from a substantially elliptical mode field to a circularly symmetric mode field and is focused by GRIN-fiber lens 24 such that optical signal 76 is efficiently coupled to pigtail fiber 22 having a substantially circularly symmetric mode field.

Although not required, substrate 72 may preferably be a silicon optical bench having a <111> facet etched or otherwise formed on substrate 72, and including a V-groove 79 for supporting the multi-lens apparatus 20 in proper alignment with signal source 74.

Although not shown in the drawing figures, it is also important that the wavefronts are matched, as closely as possible. Failure to do so may result in aberrations, which are the result of constructive or destructive interference with coupling efficiency. In the past, those skilled in the art adjusted the properties of the lenses, for instance the GRIN-fiber lens, such as the refractive index profile of the GRIN-fiber lens, by actually changing the chemical properties of the glass itself. This is very time consuming and does not facilitate the efficient manufacture of mode field coupling assemblies. In accordance with the present invention, the size and shape of the GRIN-fiber lens, the use of spacer rods which act to move the optical signal image without adding any significant lens effect to the optical signal image, the size and number of spacer rods, and the independent control (in the x-plane and y-plane) of the shape of the external surface curves defining biconic lens 26, enable those skilled in the art to easily and efficiently substantially match these wavefronts in a manner that is practical, efficient and cost effective for mass manufacture of mode field coupling assemblies. In addition, and although not shown in the figures discussed above, the above mentioned principals are equally applicable to those embodiments of the optical assembly of the present invention where the optical signal is directed through the pigtail fiber, then through the GRIN-fiber lens, through the biconic lens and is coupled to an optical waveguide device, such as, but not limited to an SOA or other detector/photo-diode.

EXAMPLE

An example of an in-line beam altering multi-lens apparatus and optical assembly in accordance with the above-mentioned embodiments of the present invention will now be described.

Figure 7:
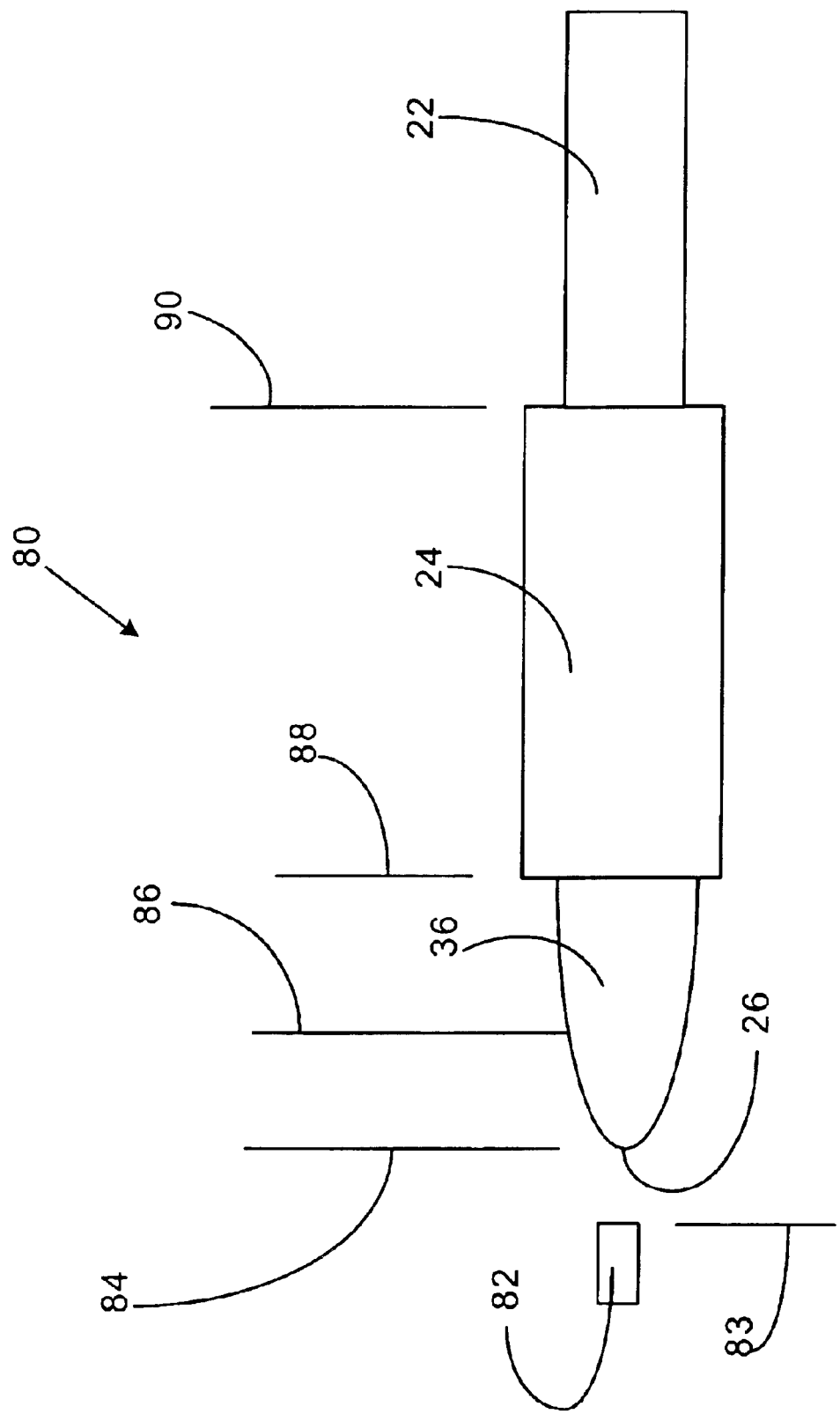
FIG. 7 schematically illustrates the arrangement of the in-line multi-lens apparatus of the present invention, including the designation of the various design variables.

An exemplary in-line multi-lens apparatus 80, including a biconic lens 26, is shown schematically in FIG. 7 with reference to the variables described below. The exemplary multi-lens apparatus includes a source 82 of an optical signal, in this case a laser diode capable of emitting a signal at an operating wavelength 'wav'; Mode-field-diameter (MFD) in the x-direction (vertical direction) of wx0($\mu$m), and MFD in the y-direction of wy0 ($\mu$m). The beam from the source 82 propagates through a medium (most commonly air) of index (nl) for a distance (z) before falling on a biconic lens 26 with radii of curvature of (RLx) ($\mu$m) in the x-direction and (Rly) ($\mu$m) in the y-direction that is formed on a spacer rod 36 having a radially constant refractive index profile and a length (Lc) and index (nc). The MFD of the optical signal before the cylindrical biconic lens is wx1, and wy1, and beam wavefront radii of curvature are rx1, and ry1. The optical signal is transformed by the biconic lens to a beam with MFD and wavefront radii of curvatures of wx2, wy2 and rx2, ry2, respectively. For a thin lens, wx1=wx2 and wy1=wy2, but rx2 and ry2 are not generally the same as rx1 and ry1. The beam then propagates through the space rod 36 section of length Lc and index nc. The beam characteristics after this propagation are wx3, wy3 and rx3, and ry3. A beam having these characteristics falls on the GRIN-fiber lens with characteristics of length Lg, average index ng, index diff=delta, and core radius of (a). After propogating through the GRIN-fiber lens 24 the beam characteristics are wx4, wy4, rx4, ry4. The objective of the design is to make wx4=wy4=wsmf, where (wsmf) is the circular MFD of the standard single mode pigtail fiber 22. Another objective is to make rx4 and ry4 as close to a flat wavefront as possible to maximize the coupling efficiency to the pigtail fiber. This objective may be achieved for any given source 82 and pigtail fiber 22 by modifying the design variables such as Z, Rx, Ry, Lc of the biconic lens 25, the spacer rod 36, and also the characteristics of the GRIN-fiber lens 24, such as Lg, Delta, and (a). The objective also is to make Z reasonably large for reasonable tolerances and practical packaging requirements without compromising the coupling efficiency.

The beam transformation can be calculated for the gaussian beams using the ABCD matrix procedures for the complex beam parameter q as disclosed in the references incorporated herein by reference, or using the beam propagation techniques. The design is preferably optimized for the best coupling efficiency for any desired z, as well as the source 82 and pigtail fiber 22 characteristics. The material characteristics nl, nc, ng, and ns can be varied to some extent, but practical material considerations limit their values. For example, nl is generally equal to 1 (air), nc is mostly silica or doped silica with values of ~1.45 $\mu$m or at least near the 1.3–1.55 $\mu$m wavelength range. The same is true for ng and nsmf.

Complex beam parameter q is defined as:

$$(1/q)=(1/r)-i*(wav/(pi*w^2*n))$$

where r is the wavefront radius of curvature, w is the gaussian mode fixed radius, and wav is the wavelength of light.

The q parameter transformation from input plane 84 to output plane 86 is given by:

$$q2=(A*q1+B)/(C*q1+D)$$

where A, B, C, D are the elements of the ray matrix relating the ray parameters of the input and output plane, 84 and 86, respectively.

1) ABCD matrix for free space propagation of length $$z = \begin{bmatrix} 1 & z \\ 0 & 1 \end{bmatrix} \qquad 2$$

2) for going from a medium of index nl to $$n(\text{no length}) = \begin{bmatrix} 1 & 0 \\ 0 & (nl/n) \end{bmatrix} \qquad 3$$

3) for a lens of radius of curvature $$R = \begin{bmatrix} 1 & 0 \\ -(n2-nl)/(n2*R) & nl/n2 \end{bmatrix} \qquad 4$$

4) for GRIN-fiber Lens n'(r)=n(1-g^2*r^2)^0.5 and length $$L = \begin{bmatrix} \cos(gL) & \sin(gL)/g \\ -g*\sin(gL) & \cos(gl) \end{bmatrix} \qquad 5$$

g=((2*delta)^0.5)/a

The lens geometry and the variables of the design and MFD parameters at specific locations:

Plane 83: Output of source 82: wav, wx0, wy0– Wavelength and x, and y mode fields of the source 82

Plane 84: Propagate through Z, of material index (nl) but before the biconic lens
wx1, wy1: Mode field diameters of the beam at plane 84
rx1, ry1: Wavefront Radius of Curvature Plane 86: Just after the biconic lens of radius Rx and Ry with material index nc
wx2, wy2
rx2, ry2

Plane 88: Propagation in spacer rod of length Lc, and index nc and just in front of the Grin lens
wx3, wy3
rx3, ry3

Plane 90: After propagation through GRIN-fiber lens with Length Lg, Avg Index ng, index diff=Delta, core rad=a and just in front of the pigtail fiber:
wx4, wy4
rx4, ry4

Specific Examples for the In-Line Mulit Lens Apparatus

Figure 8:
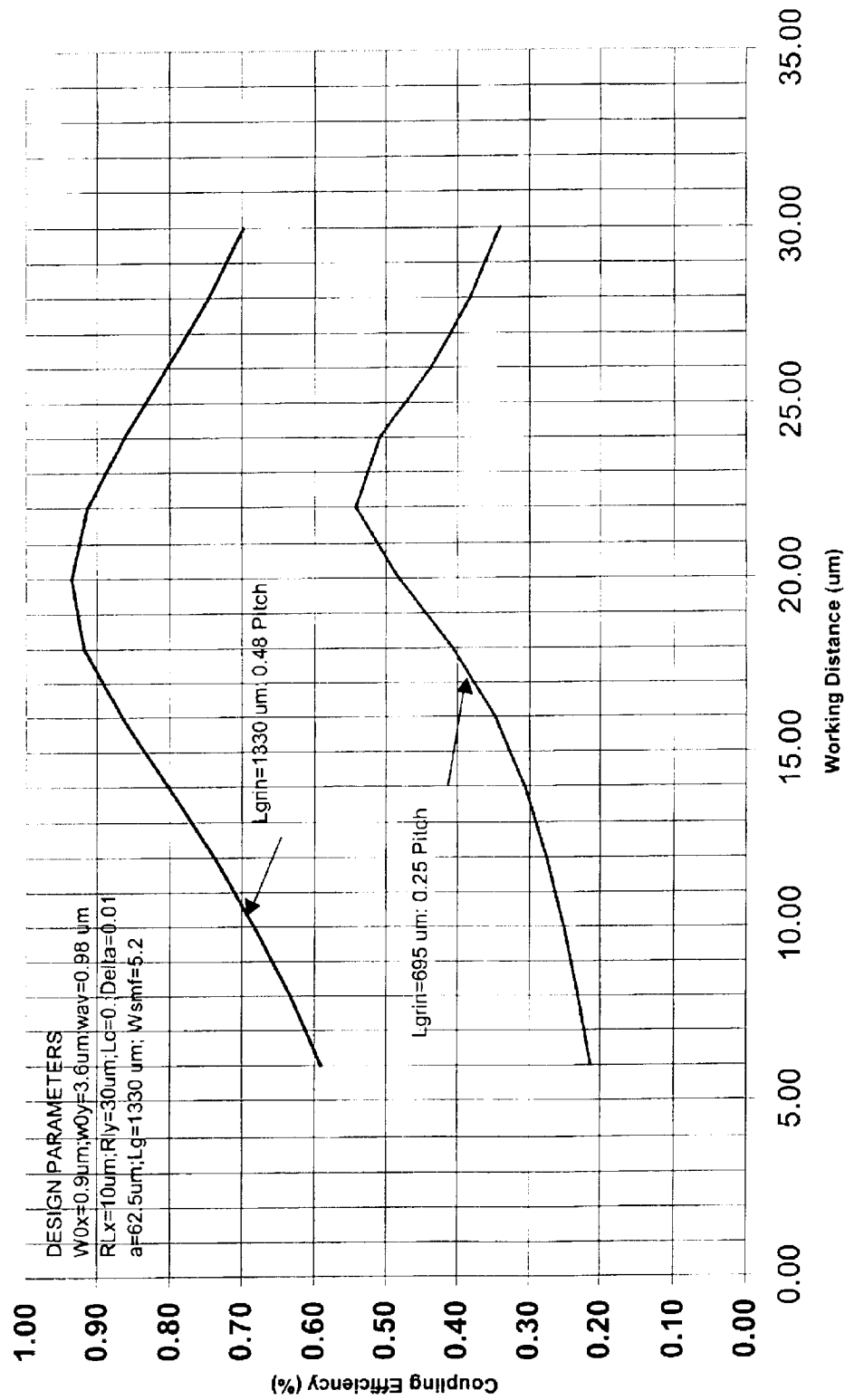
FIG. 8 is a graph depicting the coupling efficiency versus working distance for various GRIN-fiber lens lengths.

Using the procedure indicated above, the design variables of the multi-lens apparatus for a laser diode coupling application may be calculated and optimized. Coupling efficiency calculations done as a function of working distance for two lengths of GRIN-fiber section are shown in FIG. 8. Based on this curve, the optimum working distance for this design is approximately 20.0 $\mu$m, which is a reasonable value for practical packaging and alignment requirements. The laser diode characteristics and other design parameters are listed below:

Laser diode characteristics:

| | |
|---|---|
| Wavelength: | 0.98 $\mu$m |
| Mode-field radius in X-direction w0x: | 0.9 $\mu$m |
| Mode Filed radius in Y-direction w0y: | 3.6 $\mu$m |

-continued

OTHER DESIGN PARAMETERS

| | |
|---|---|
| X-radius of curvature of biconic lens RLx | 10 μm |
| Length of spacer rod Lc: | 0 |
| GRIN-fiber Length Lg: | 1330 μm |
| GRIN-fiber Index Difference Delta: | 0.01 |
| GRIN-fiber Core Radius a: | 62.5 |
| Single mode pigtail fiber Mode-field: | 5.2 μm |

Figure 9:
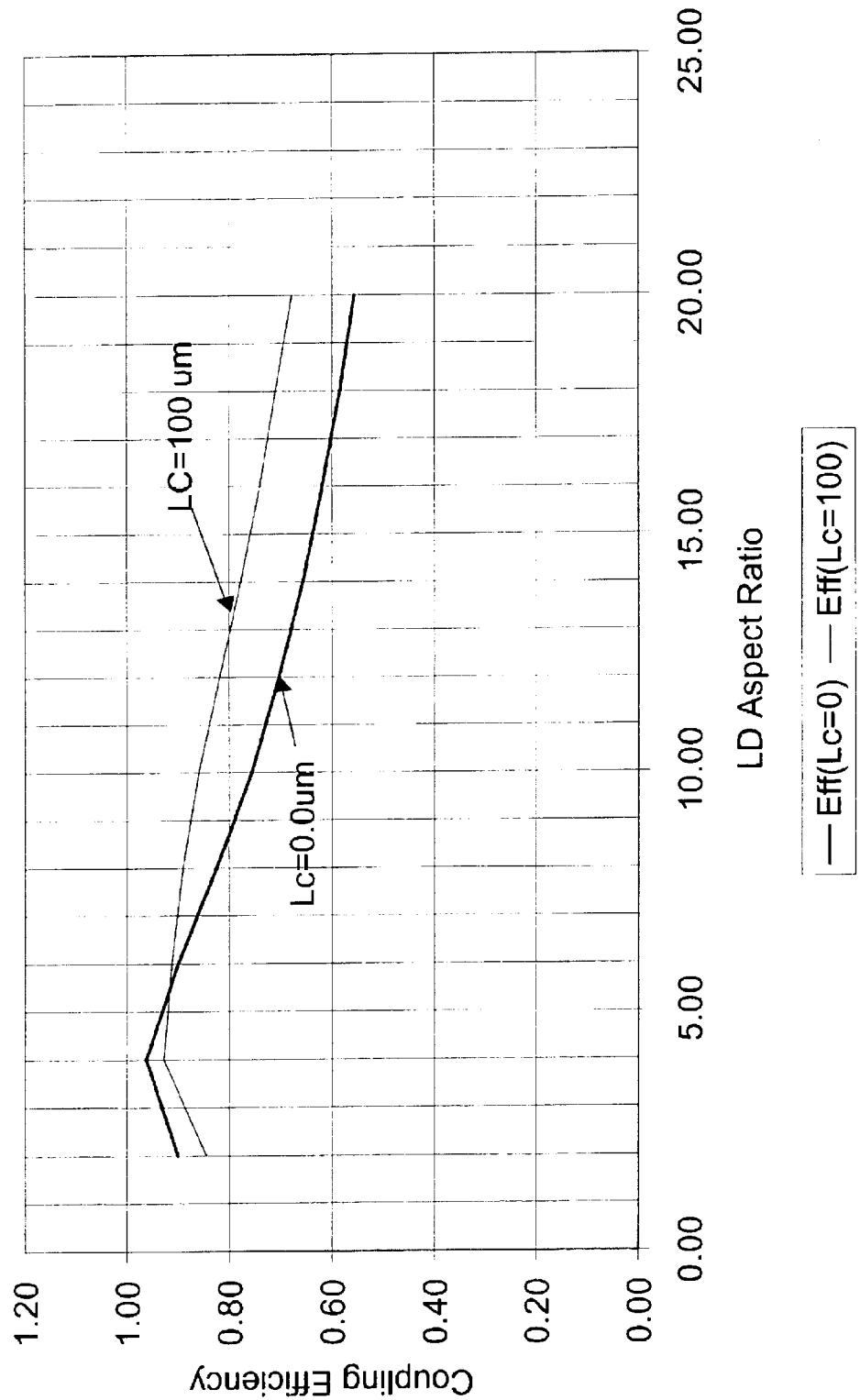
FIG. 9 is a graph depicting the coupling efficiency versus laser diode aspect ratios for various spacer rod lengths.

In FIG. 9, the benefit of using a coreless spacer rod before the GRIN-fiber lens for high aspect ratio laser diode beams is indicated. The benefit becomes clear for the laser diode with an aspect ratio of >5 for the designs considered here. In this calculation the GRIN-fiber lens characteristics and pigtail SMF characteristics are the same as above. The working distance is fixed at Z=20.0 μm. As can be seen, the longer spacer rod length Lc provides better coupling efficiency for the higher aspect ratio LD. The improvement is calculated to be more than 10% for aspect ratios greater than ~8.

The example is given for illustrative purposes only and will vary based on the applications. The foregoing example may be more clearly understood with reference to the following references: W. L. Emkey and C. Jack, JLT-5 September 1987, pp.1156–64; H. Kogelnik, Applied Optics, 4 Dec. 1965, p1562; R. Kishimoto, M. Koyama; *Transactions on Microwave Theory and Applications*, IEEE MTT-30, June 1982, p882; and *Photonics* by B. E. A. Saleh and M. C. Teich, John Wiley & Sons, Inc., 1991, each of which is hereby incorporated herein by reference. Additional aspects, features, and characteristics of the present invention may be found in the co-pending U.S. non-provisional application entitled, "Optical Signal Altering Lensed Apparatus and Method of Manufacture," which is commonly owned by Corning, Incorporated, filed on the same day herewith, and is hereby incorporated herein by reference.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. For example, GRIN-fiber lens 24 may be manufactured such that its refractive index profile varies longitudinally rather than radially as described above. In addition, one of skill in the art will recognize that the various components/elements of multi-lens apparatus 20 of the present invention need not be manufactured from nor embody the same materials, provided the various materials forming the various elements of multi-lens apparatus 20 are compatible with respect to characteristics, such as, but not limited to, softening point, and coefficient of thermal expansion. Therefore, the above mentioned description is to be considered exemplary, rather than limiting, and the true scope of the invention is that defined in the following claims.

What is claimed is:

1. A multi-lens apparatus for altering the mode field of an optical signal, the apparatus comprising:
    an optical fiber having a core region defining an optical axis;
    at least one GRIN-fiber lens positioned in relation to one end of the optical fiber;
    a biconic lens positioned in relation to an end of the GRIN-fiber lens remote from the fiber, wherein the biconic lens includes an external surface defined by two different curves disposed substantially orthogonal to one another, a major curve $C_1$ and a minor curve $C_2$, with $C_1$ and $C_2$ intersecting at or near the optical axis; and
    one or more spacer rods, each having a radially constant index of refraction, positioned between the optical fiber and the GRIN-fiber lens or the GRIN-fiber lens and the biconic lens.

2. The multi-lens apparatus of claim 1 wherein both of the curves $C_1$ and $C_2$ each define a sphere.

3. The multi-lens apparatus of claim 2 wherein the at least one GRIN-fiber lens comprises a plurality of GRIN-fiber lenses.

4. The multi-lens apparatus of claim 1 wherein both of the curves $C_1$ and $C_2$ each define an asphere.

5. The multi-lens apparatus of claim 1 wherein one of the curves $C_1$ or $C_2$ defines an asphere while the other of the curves $C_1$ or $C_2$ defines a sphere.

6. The multi-lens apparatus of claim 1 wherein the GRIN-fiber lens is affixed to the optical fiber.

7. The multi-lens apparatus of claim 1 wherein the biconic lens is formed directly on the end of the GRIN-fiber lens.

8. The multi-lens apparatus of claim 1 wherein the GRIN-fiber lens is affixed to the one or more spacer rods.

9. The multi-lens apparatus of claim 1 wherein the biconic lens is formed directly on the end of the spacer rod remote from the GRIN-fiber lens.

10. The multi-lens apparatus of claim 1 wherein one or more of the optical fiber and the GRIN-fiber lens comprises a geometric shape other than cylindrical.

11. The multi-lens apparatus of claim 10 wherein the geometric shape comprises a rectangle.

12. The multi-lens apparatus of claim 10 wherein the geometric shape comprises a square.

13. The multi-lens apparatus of claim 10 wherein the geometric shape comprises an ellipsoid.

14. The multi-lens apparatus of claim 1 wherein each of the optical fiber and the GRIN-fiber lens define an outside diameter and wherein the outside diameters differ in size from one another.

15. The multi-lens apparatus of claim 1 wherein each of the optical fiber and the GRIN-fiber lens define an outside diameter and wherein the outside diameters are equal in size to one another.

16. The multi-lens apparatus of claim 1 wherein the biconic lens is formed by laser micro-machining.

17. The multi-lens apparatus of claim 1 wherein the GRIN-fiber lens comprises a tapered GRIN-fiber lens.

18. The multi-lens apparatus of claim 1 wherein the one or more spacer rods comprises a tapered spacer rod.

19. The multi-lens apparatus of claim 1 wherein the biconic lens is shaped to change the size of a mode field passing therethrough without substantially altering the shape of the mode field.

20. A multi-lens apparatus for altering the mode field of an optical signal, the apparatus comprising:
    an optical fiber having a core region defining an optical axis;
    at least one GRIN-fiber lens positioned in relation to one end of the optical fiber;
    a biconic lens positioned in relation to an end of the GRIN-fiber lens remote from the fiber, wherein the biconic lens includes an external surface defined by two different curves disposed substantially orthogonal to one another, a major curve $C_1$ and a minor curve $C_2$, with $C_1$ and $C_2$ intersecting at or near the optical axis; and a non-circular spacer rod positioned between the GRIN-fiber lens and the biconic lens.

21. A multi-lens apparatus for altering the mode field of an optical signal, the apparatus comprising:
   an optical fiber having a core region defining an optical axis;
   at least one GRIN-fiber lens positioned in relation to one end of the optical fiber;
   a biconic lens positioned in relation to an end of the GRIN-fiber lens remote from the fiber, wherein the biconic lens includes an external surface defined by two different curves disposed substantially orthogonal to one another, a major curve $C_1$ and a minor curve $C_2$, with $C_1$ and $C_2$ intersecting at or near the optical axis;
   a non-circular spacer rod positioned between the GRIN-fiber lens and the biconic lens, wherein the non-circular spacer rod is a rectangular rod and wherein the biconic lens is formed directly on the end of the rectangular rod remote from the GRIN-fiber lens.

22. A multi-lens apparatus for altering the mode field of an optical signal, the apparatus comprising:
   an optical fiber having a core region defining an optical axis;
   at least one GRIN-fiber lens positioned in relation to one end of the optical fiber;
   a biconic lens positioned in relation to an end of the GRIN-fiber lens remote from the fiber, wherein the biconic lens includes an external surface defined by two different curves disposed substantially orthogonal to one another, a major curve $C_1$ and a minor curve $C_2$, with $C_1$ and $C_2$ intersecting at or near the optical axis; and
   a first spacer rod positioned between the optical fiber and the GRIN-fiber lens, and a second spacer rod positioned between the GRIN-fiber lens and the biconic lens.

23. The multi-lens apparatus of claim 22 wherein the spacer rods each comprise a waveguide having a radially constant index of refraction.

24. The multi-lens apparatus of claim 23 wherein each of the optical fiber, the spacer rods and the GRIN-fiber lens define an outside diameter and wherein the outside diameter of at least one of the optical fiber, the spacer rods and the GRIN-fiber lens differs in size from the other outside diameters.

25. The multi-lens apparatus of claim 23 wherein each of the optical fiber, the spacer rods and the GRIN-fiber lens define an outside diameter and wherein the outside diameter of each of the optical fiber, the spacer rods and the GRIN-fiber lens differs in size from the other outside diameters.

26. The multi-lens apparatus of claim 23 wherein each of the optical fiber, the spacer rods and the GRIN-fiber lens define an outside diameter and wherein the outside diameters are equal in size.

27. The multi-lens apparatus of claim 22 wherein one or more of the optical fiber, the spacer rods and the GRIN-fiber lens comprises a geometric shape other than circular.

28. The multi-lens apparatus of claim 27 wherein the geometric shape comprises a rectangle.

29. The multi-lens apparatus of claim 27 wherein the geometric shape comprises a square.

30. The multi-lens apparatus of claim 27 wherein the geometric shape comprises an ellipsoid.

31. A system comprising:
   an optical component;
   a substrate configured to support the optical component; and
   a multi-lens apparatus positioned on the substrate and in relation to the optical component to change the mode field of an optical signal passed between the multi-lens apparatus and the optical component, the multi-lens apparatus comprising:
      an optical fiber having a core region defining an optical axis;
      at least one GRIN-fiber lens positioned in relation to one end of the optical fiber;
      a biconic lens positioned in relation to an end of the GRIN-fiber lens remote from the fiber, wherein the biconic lens includes an external surface defined by two different curves disposed substantially orthogonal to one another, a major curve $C_1$ and a minor curve $C_2$, with $C_1$ and $C_2$ intersecting at or near the optical axis; and
      one or more spacer rods, each having a radially constant index of refraction, positioned between the optical fiber and the GRIN-fiber lens or the GRIN-fiber lens and the biconic lens.

32. A method of manufacturing a multi-lens apparatus for altering the mode field of an optical signal, the method comprising the steps of:
   positioning one end of a GRIN-fiber lens in relation to one end of an optical fiber having a core region defining an optical axis;
   disposing a biconic lens in relation to an end of the GRIN-fiber lens remote from the optical fiber, wherein the biconic lens includes an external surface defined by two different curves disposed substantially orthogonal to one another, a major curve $C_1$ and a minor curve $C_2$, and wherein $C_1$ and $C_2$ intersect at or near the optical axis; and
   disposing one or more spacer rods, each having a radially constant index of refraction, between the optical fiber and the GRIN-fiber lens or the GRIN-fiber lens and the biconic lens.

33. The method of claim 32 wherein the disposing a biconic lens step comprises the step of laser micromachining the end of the GRIN-fiber lens remote from the optical fiber.

34. The method of claim 32 wherein the positioning step comprises the steps of splicing the one end of the GRIN-fiber lens to the one end of the optical fiber and cleaving the GRIN-fiber lens to the desired length, and wherein the disposing a biconic lens step comprises the step of forming the biconic lens on the cleaved end of the GRIN-fiber lens.

35. The method of claim 34 wherein the forming step comprises the steps of grinding and polishing the cleaved end of the GRIN-fiber lens.

36. The method of claim 34 wherein the forming step comprises the steps of grinding, polishing and heating the cleaved end of the GRIN-fiber lens.

37. The method of claim 32 wherein the positioning step comprises the steps of splicing the one end of the GRIN-fiber lens to the one end of the optical fiber and cleaving the GRIN-fiber lens to the desired length, wherein the disposing one or more spacer rods step comprises the step of affixing one end of a spacer rod to the cleaved end of the GRIN-fiber lens, and wherein the disposing a biconic lens step comprises shaping the other end of the spacer rod to form the biconic lens.

38. The method of claim 37 wherein the shaping step comprises the steps of grinding and polishing.

39. The method of claim 37 wherein the shaping step comprises the steps of grinding, polishing, and heating.

40. The method of claim 32 wherein said disposing one or more spacer rods step comprises the steps of positioning a first spacer rod between the optical fiber and the GRIN-fiber lens and positioning a second spacer rod between the GRIN-fiber lens and the biconic lens.

41. The method of claim 40 wherein the disposing step comprises the step of forming the biconic lens on an end of the second spacer rod remote from the GRIN-fiber lens.

42. The method of claim 32 further comprising the step of tapering the GRIN-fiber lens.

43. A method of manufacturing a multi-lens apparatus for altering the mode field of an optical signal, the method comprising the steps of:
    positioning one end of a GRIN-fiber lens in relation to one end of an optical fiber having a core region defining an optical axis; and
    disposing a biconic lens in relation to an end of the GRIN-fiber lens remote from the optical fiber, wherein the biconic lens includes an external surface defined by two different curves disposed substantially orthogonal to one another, a major curve $C_1$ and a minor curve $C_2$, and wherein $C_1$ and $C_2$ intersect at or near the optical axis;
    wherein the positioning step comprises the steps of splicing the one end of the GRIN-fiber lens to the one end of the optical fiber, and cleaving the GRIN-fiber lens to the desired length, and wherein the disposing step comprises the steps of affixing one end of a rectangular rod to the cleaved end of the GRIN-fiber lens and shaping the other end of the rectangular rod to form the biconic lens thereon.

44. The method of claim 43 wherein the shaping step comprises the steps of grinding and polishing.

45. The method of claim 43 wherein the shaping step comprises the steps of grinding, polishing, and heating.

46. The method of claim 43 wherein the shaping step comprises the step of reflowing the other end of the rectangular rod to the desired shape via heating.

47. An optical assembly comprising:
    an optical component;
    a substrate configured to support the component; and
    a multi-lens apparatus positioned on the substrate and in relation to the optical component to change the mode field of an optical signal passed between the multi-lens apparatus and the optical component, wherein the multi-lens apparatus includes an optical fiber having a core region defining an optical axis, a GRIN-fiber lens positioned in relation to one end of the optical fiber, and a biconic lens formed in relation to an end of the GRIN-fiber lens remote from the fiber, wherein the biconic lens includes an external surface defined by two different curves disposed substantially orthogonal to one another, a major curve $C_1$ and a minor curve $C_2$, with $C_1$ and $C_2$ intersecting at or near the optical axis;
    wherein the multi-lens apparatus further includes one or more spacer rods each having a radially constant index of refraction, and wherein the one or more spacer rods are positioned between one or more of the optical fiber and the GRIN-fiber lens and the GRIN-fiber lens and the biconic lens.

48. The optical assembly of claim 47 wherein the optical component is a laser diode and wherein the substrate is a silicon optical bench.

49. The optical assembly of claim 47 wherein the outside diameter of the optical fiber and the outside diameter of the GRIN-fiber lens are substantially equal.

50. The optical assembly of claim 47 wherein the outside diameter of the optical fiber is less than the outside diameter of the GRIN-fiber lens.

51. The optical assembly of claim 47 wherein the outside diameter of the optical fiber is greater than the outside diameter of the GRIN-fiber lens.

52. The optical assembly of claim 47 wherein one or more of the optical fiber and the GRIN-fiber lens comprises a geometric shape other than cylindrical.

53. The optical assembly of claim 47 wherein one or more of the optical fiber, the GRIN-fiber lens and the one or more spacer rods comprises a geometric shape other than cylindrical.

54. The optical assembly of claim 47 wherein one or more of the optical fiber, the GRIN-fiber lens and the one or more spacer rods include an alignment feature.

55. The optical assembly of claim 47 wherein the multi-lens apparatus is tapered.

* * * * *